United States Patent
Jacob et al.

(10) Patent No.: US 11,269,687 B2
(45) Date of Patent: Mar. 8, 2022

(54) MAP REDUCE USING COORDINATION NAMESPACE HARDWARE ACCELERATION

(71) Applicant: International Business Machines Corporation, Armonk, NY (US)

(72) Inventors: Philip Jacob, Congers, NY (US); Philip Neil Strenski, Yorktown Heights, NY (US); Charles Johns, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 16/437,320

(22) Filed: Jun. 11, 2019

(65) Prior Publication Data

US 2020/0394077 A1  Dec. 17, 2020

(51) Int. Cl.
| | | |
|---|---|---|
| *G06F 15/16* | (2006.01) | |
| *G06F 9/50* | (2006.01) | |
| *G06F 16/22* | (2019.01) | |
| *G06F 9/48* | (2006.01) | |

(52) U.S. Cl.
CPC .......... *G06F 9/5044* (2013.01); *G06F 9/4881* (2013.01); *G06F 9/5016* (2013.01); *G06F 16/2255* (2019.01)

(58) Field of Classification Search
None
See application file for complete search history.

(56) References Cited

U.S. PATENT DOCUMENTS

| | | | |
|---|---|---|---|
| 8,296,743 B2 | 10/2012 | Linderman et al. | |
| 8,738,657 B2 * | 5/2014 | Kuno | G06F 16/278 707/797 |
| 8,972,986 B2 | 3/2015 | Palanisamy et al. | |
| 8,984,085 B2 | 3/2015 | Jung | |

(Continued)

OTHER PUBLICATIONS

Seo et al., "HPMR: Prefetching and pre-shuffling in shared MapReduce computation environment," Cluster Computing and Workshops, Oct. 2009. Cluster'09. IEEE International Conference on, pp. 1-8.

(Continued)

*Primary Examiner* — Alex Gofman
(74) *Attorney, Agent, or Firm* — Scully, Scott, Murphy & Presser, PC; Daniel P. Morris, Esq.

(57) ABSTRACT

A system and method for supporting data MapReduce operations in a tuple space/coordinated namespace (CNS) extended memory storage architecture. The system-wide CNS provides an efficient means for storing and communicating data generated by local processes running at the nodes, and coordinated to provide MapReduce operations in a multi-nodal system. A hardware accelerated mechanism supports map reduce sorting/shuffle operations and reduce operations according to an aggregate function. Local processes running at a node generate a tuple corresponding to data generated by a process, each tuple having a tuple name and tuple data value corresponding to the generated data. Each tuple is processed and stored at the node or another node, dependent upon its tuple name. Tuple records associated with a tuple name are accumulated at one or more nodes according to a linked list structure at each that is accessible via a hash table index pointer at the node.

18 Claims, 16 Drawing Sheets

(56) References Cited

U.S. PATENT DOCUMENTS

| | | | |
|---|---|---|---|
| 9,495,475 B2* | 11/2016 | Weinberg | G06F 16/258 |
| 9,760,619 B1* | 9/2017 | Lattanzi | G06F 16/9024 |
| 10,033,570 B2 | 7/2018 | Alatorre et al. | |
| 2014/0201753 A1* | 7/2014 | He | G06F 9/4881 |
| | | | 718/104 |
| 2015/0067087 A1* | 3/2015 | Guerin | G06F 12/10 |
| | | | 709/212 |
| 2015/0288624 A1* | 10/2015 | Raindel | G06F 13/382 |
| | | | 709/219 |
| 2016/0078069 A1 | 3/2016 | Tiwari et al. | |
| 2017/0091305 A1* | 3/2017 | Cao | G06F 16/285 |

OTHER PUBLICATIONS

Hammoud et al., "Locality-Aware Reduce Task Scheduling for MapReduce," 2011 IEEE Third International Conference on Cloud Computing Technology and Science, Athens, Nov. 2011, pp. 570-576.

* cited by examiner

MAP REDUCE USING COORDINATION NAMESPACE HARDWARE ACCELERATION

STATEMENT REGARDING FEDERALLY SPONSORED RESEARCH OF DEVELOPMENT

This invention was made with U.S. Government support under Contract. No. B621073 awarded by the Department of Energy. The government has certain rights to this invention.

FIELD

The present invention generally relates to memory architectures and memory management, and particularly a hardware acceleration mechanism for supporting map reduce operations for processes in a multi-node computing system.

BACKGROUND

MapReduce is implemented to process large data sets in a parallel distributed system. It has three components—mapping method to generate a tuple(key, value) for each data, shuffle to sort into different queues and reduce function to aggregate this sorted values. This is currently implemented in software and performance is limited as it relies on libraries that do not take advantage of hardware.

SUMMARY

A hardware accelerated system and method to support map reduce functionality in a Coordination Namespace architecture with minimal additional changes and more efficiently.

A hardware accelerated system and method for MapReduce Shuffle/sorting using network and a hashing table index in a coordination namespace architecture.

A system and method to build upon a CNS architecture and its distributed key value store including the use of CNS opcodes CSShuffle, CSReduce along with tuple engine and data structure modifications to support map reduce operations.

In one aspect, there is provided a method for mapping and reducing data generated by a plurality of processes running at one or more distributed computing nodes sharing a coordination namespace. The method comprises: generating, by a local process running at a current node, a tuple corresponding to data generated by the local process, each the tuple having a tuple name and tuple data value corresponding to the generated data, the tuple generated by applying, by the local process, a mapping function to map the generated data to the tuple name and tuple data value; receiving, at a controller at the current node, one or more messages requesting a shuffleing operation for accumulating tuples associated with a specified tuple name;—allocating, by the controller, responsive to a received shuffle message, a named data element corresponding to the specified tuple name in the coordination namespace at the current node or another node; storing, at one or more memory locations associated with the named data element, tuple data records including the tuple data values from each the one or more messages received at the current node or another node corresponding to data generated from the local processes specifying the tuple name; and receiving, at the controller, a reduce message from a requesting process running at the current node or another node, the reduce message specifying the tuple name and an aggregation function; and returning, using the controller, a data corresponding to the aggregation function associated with the stored tuple data values associated with the tuple name.

In accordance with a further aspect of the invention, there is provided a system for mapping and reducing data generated by a plurality of processes running at one or more distributed computing nodes sharing a coordination namespace. The system comprises: one or more data generated by local processes running at a current node, and the local processes configured to apply a mapping function to generate a tuple comprising a tuple name and tuple data value corresponding to the generated data; a controller circuit associated with a current node of the multi-node computing system, the controller circuit configured to perform a method to: receive one or more messages requesting a shuffling operation for accumulating tuples associated with a specified tuple name; allocate, responsive to a received shuffle message, a named data element corresponding to the specified tuple name in the coordination namespace at the current node or another node; store, at one or more memory locations associated with the named data element, tuple data records including the tuple data values from each the one or more messages received at the current node or another node corresponding to data generated data from the local processes specifying the tuple name; receive a reduce message from a requesting process running at the current node or another node, the reduce message specifying the tuple name and an aggregation function; and return a data corresponding to the aggregation function associated with the stored tuple data values associated with the tuple name.

The present invention is advantageously employed in a multiprocessing computer system having a plurality of processor devices each competing for access to a shared memory structure, however, can easily be adapted for use in multi-core uniprocessor computer systems.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

The present disclosure provides a novel hardware acceleration mechanism to support map reduce operations for data generated byprocesses in a multi-node computing system having an extended memory defining a tuple space/coordination namespace. According to embodiments, a MapReduce framework include operations for processing large data sets in a parallel distributed system and includes three components—1) mapping method to generate a tuple (key, value) for each data, 2) shuffle to sort into different queues, and 3) reduce function to accumulate this sorted values. A tuple space/coordination namespace provides an architecture including a distributed key value store to efficiently perform these operations.

In an embodiment, the description makes use of and extends the Coordinated Namespace (CNS) system and methods described in commonly-owned, U.S. patent application Ser. No. 16/217,905 entitled Coordinated Namespace Processing, the whole contents and disclosure of each of which are incorporated herein by reference as if wholly set forth herein. The description further makes use of and extends the systems and methods described in commonly-owned, U.S. patent application Ser. Nos. 15/851,480 and 15/851,511, both entitled Data Shuffling With Hierarchical Tuple Spaces and incorporated by reference herein.

The following are abbreviations of terms representing entities involved in the various system and methods herein for data MapReduce (map reduce) operations in a CoordinationSpace (CS) or CoordinationNameSpace (CNS) system.

An ActualHome (AH) or Home, is a node where the named data element (tuple) is actually stored.

A NaturalHome (NH) is a name of a node obtained from the hash applied to the tuple name, always informed.

A PreferredHome (PH) can be a NH or from a user-specified group, AH for OUT, where to look first for RD tuple message (command sent to retrieve a tuple from CNS), and for IN tuple message (command sent to retrieve the tuple from CSN and store it in the requestor node).

A LocalNode (LN) is RequestNode (RN) representing a node where a request originated.

A HashElement (HE) refers to a single (one) record per unique name in CS, e.g., one HE per multiple tuples of the same name.

A PendingRecord (PR) is a tuple record that record the metadata of a tuple itself or a pending request for them.

A LocalTuple (LT) represents a metadata record at the actual home.

A RemoteTuple (RT) represents a metadata record at the NH about tuple homed elsewhere.

Storage class memory (SCM) is a persistent memory extending dynamic memory (DRAM).

A Work queue (WQ) is a hardware work queue; and WQM is a hardware work queue manager. The work manager can be an FPGA (field programmable gate array) to implement the work queue/tuple engines. Alternately, the work manager functions can be a programmable accelerator implementing these functions.

Figure 1:
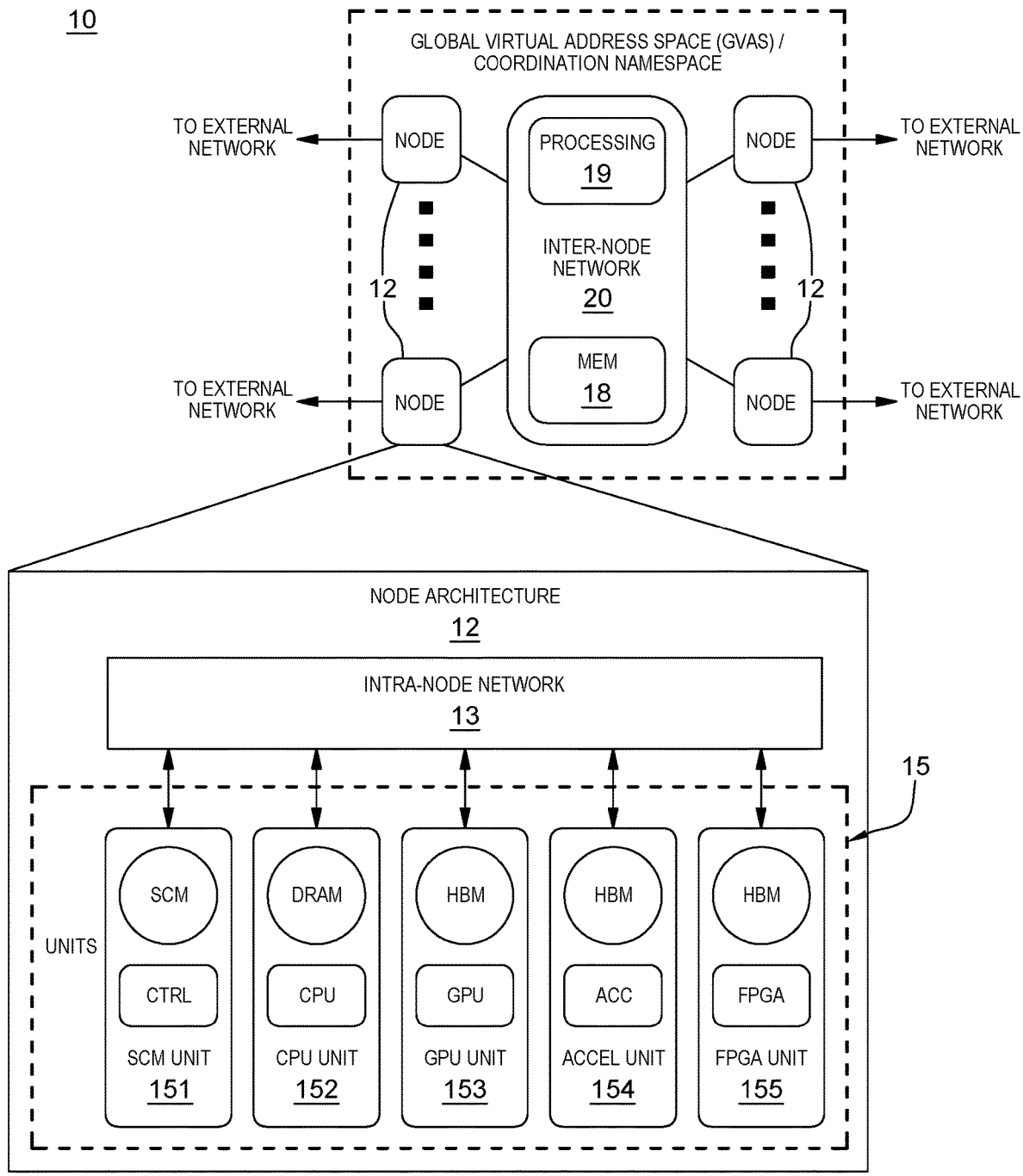
FIG. 1 illustrates an extended memory architecture constructed using a node architecture of multiple processing nodes in which the present systems and methods are employed according to embodiments herein.

FIG. 1 depicts a schematic diagram of a multi-node computer system in which a hardware MapReduce system and method of the invention are employed. FIG. 1 is particularly illustrative of an extended memory architecture 10 constructed using a node architecture of multiple processing nodes 12. At the conceptual level, this architecture enables constructing a system from "units" 15 that combine memory pools and processing capability. In an embodiment, multiple types of units 15 are possible. A node 12 may contain a single unit or multiple units 15. Examples of units 15 in a node, may include a memory service unit (Storage Class Memory Unit) 151, a Sequential Processing unit (e.g., a DRAM and CPU) 152, a Throughput Processing unit (High Bandwidth Memory and Graphic Processing Unit (GPU))) 153, and acceleration unit 154 or FPGA unit 155.

Unlike previous architectures where GPUs and accelerators are dependent on the host processor, units are independent and treated as peers under the extended memory architecture 10. These units may be optimized for specific computational and memory task. The architecture depicts a collection of units where intra-node network 13 provides an efficient coherent interconnect between the units within a single node 15 and Inter-node network 20, e.g., Ethernet or Infiniband® or like network, interconnecting the computing nodes 12 within the system 10. Similar to a unit, the Inter-node Network 20 may also contain memory 18 and associated processing 19. The "external networks" identify access beyond the extended memory architecture 10.

In embodiments, methods are implemented for dynamically creating a logical grouping of units from one or more Nodes 12 to perform an application, wherein at least one of these units can run an operating system including a master process (not shown) that can setup the CNS system. The units 15 may be, for example, a combination of general-purpose processors, special purpose processors, programmable logic devices, controllers, memory, and the like. To dynamically configure a logical group, these units need to appear to software, especially the operating system and device drivers, as if these are all part of a physically connected system within the shared memory space. To support the connected view, a system manager or management software may assign each unit within a node 12 to an application. A system manager (not shown) may schedule jobs that run over the full set of nodes in the system, start jobs (applications or workflows), and assign the resources at job launch when the required resources are available.

As described in herein incorporated U.S. patent application Ser. No. 16/217,905, the extended memory (EM) architecture 10 architecture for accessing memory beyond a node 12. The EM architecture includes a method for accessing memory referred to as Coordination Namespace (CSN) methods distributed over the full system. Nodes within the extended memory architecture have major characteristics: (1) Capable of being managed by a single operating system; (2) Efficient coherent load/store access to all memory pools within the node; (3) a Global Virtual Address Space for referencing memory pools inside and outside the node; and (4) access to a system wide Coordination Namespace.

As described in commonly-owned, U.S. patent application Ser. No. 16/217,905, the Coordination Namespace (CNS) is a hardware system implementing methods providing support for treating system memory or storage class memory as a key/value store with blocks of data referenced using a "name" or key.

Figure 2:
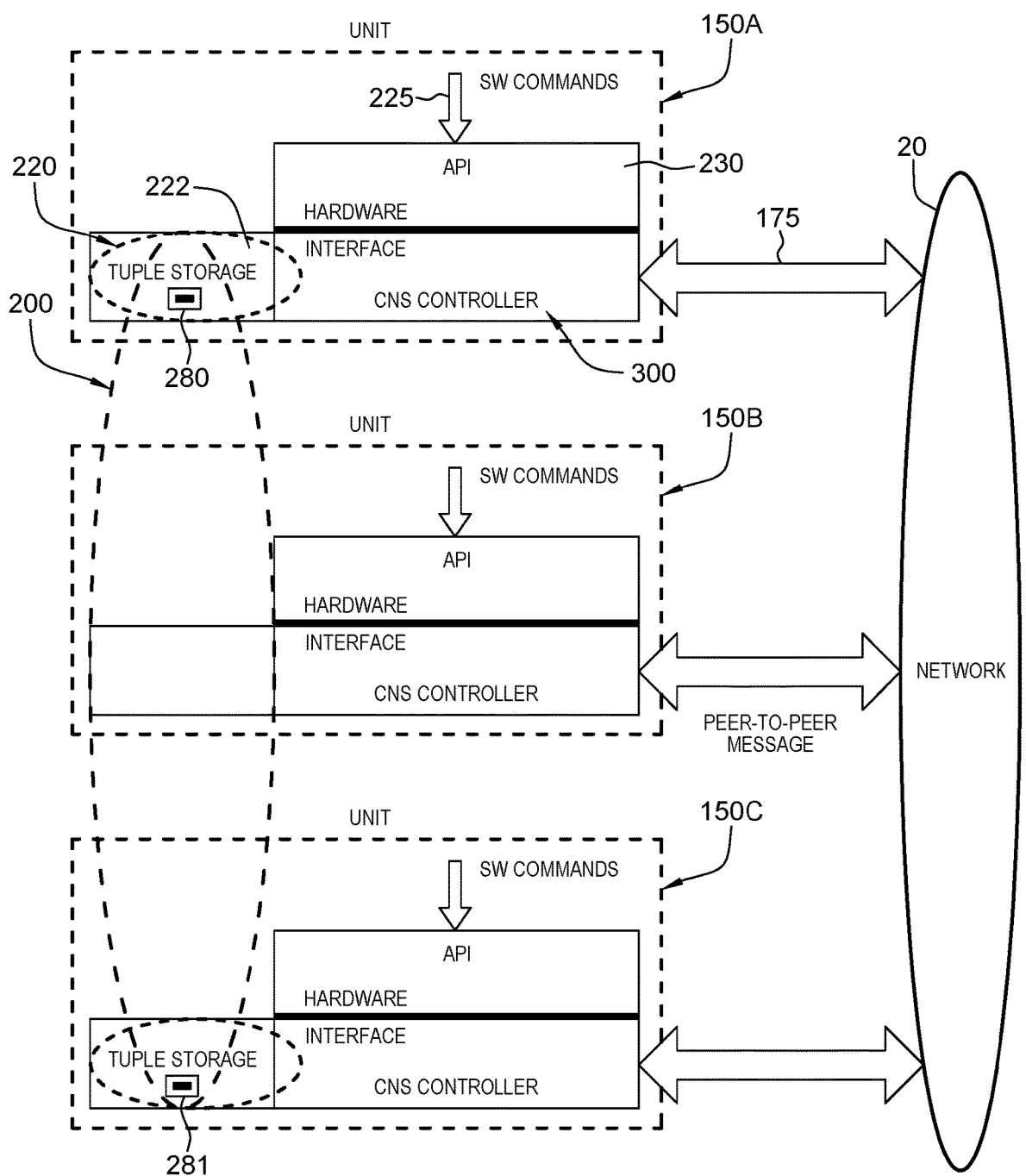
FIG. 2 shows a CNS architecture depicting networked connection of units across one or more nodes of the extended memory architecture of FIG. 1.

FIG. 2 shows a CNS architecture 100 depicting networked connection of units 150A, 150B, 150C . . . etc. across one or more nodes of the extended memory architecture 10. In an embodiment, units 150A, 150B, 150C etc. are independent and treated as peers under the extended memory architecture. These units can be for example, any combination of processors, programmable logic, controllers, or memory optimized for a specific computational/memory task. The architecture 100 depicts a collection of units where inter-node network 20 provides an efficient coherent interconnect between the units across the system.

In an example embodiment, each unit 150A, 150B, 150C . . . etc. contains a pool of memory that is divided into one or more regions each having one of three designations: (1) Globally accessible; (2) NDE storage 220; and (3) Local 222. One embodiment of the extended memory architecture may aggregate memory regions designated as globally accessible into a Global Virtual Address Space and allocate memory regions designated as NDE storage to a distributed Coordination Namespace 200.

FIG. 2 conceptually depicts the Coordination Namespace storage system 200 distributed across units 150A, 150B, 150C . . . etc. in the extended memory architecture. Units, e.g., unit 150B, do not have to contribute to storage. Units 150A, 150B, 150C . . . etc. can access CNS 200 even if not contributing storage.

As shown in FIG. 2, the plural units distributed across nodes of the extended memory architecture include at least hardware one CNS controller 300 that provides access to the Coordination Namespace. The CNS storage structure 200 provides an alternate view of extended memory that is separate from a processes' virtual address space local to the unit. In the Coordination Namespace, references to extended memory use a "name" for accessing a finite, ordered list of immutable values referred to as a Named Data Element (NDE) or "tuple". In an exemplary embodiment, the first field associated with every NDE is its name, a character string with an implementation dependent maximum length. The "name" references a NDE located in the Coordination Namespace. The "name" can simply be the first field, the name, a search template for any set of the fields in the NDE, and the like and referenced herein as a "name," a "key," or as a "NDE-name." The Coordination Namespace allows access to NDEs contained within a distributed object store.

As shown in FIG. 2, peer-to-peer messaging over network links 175 across network 20 is used for accessing remote NDEs (tuples).

In embodiments, each unit contributing storage is an owner of a set of "groups" segments of the Hash of the "name". CNS storage can be located in system memory or a Storage Class Memory (SCM), or in a File System. CNS completely implemented by software commands 225 received via an application programming interface (API) 230 to the CNS controller 300 if CNS storage is file system based.

The extended memory architecture uses NDEs or "tuples" within the Coordination Namespace system architecture 100 to communicate work between applications. In order to manage the Coordination Namespace, the system may also be associated with a CNS server that manages a Coordination Namespace located in a distributed manner across all or subset of the memory elements of the system. The part of the memory of the system associated with the Coordination Namespace is referred to as the Coordination Namespace memory 200. Parts of this memory may be in the nodes executing the applications, other parts may be in memory dedicated to the coordination. The Coordination Namespace addresses the challenges of moving data between phases of a workflow by providing an efficient means for communication between and coordination of the applications within a workflow. In addition, the Coordination Namespace also addresses the need for keeping certain types of data persistent in memory longer than the duration of a single program or application.

In FIG. 2, one of the CNS controller elements 300 is CNS Server used for accessing the Coordination Namespace memory. The CNS server in particular manages the Coordination Namespace located in a distributed manner across all nodes (each node can have its own CNS server, CNS client, or both) of the system contributing to the distributed memory. A node may contribute all its memory to the Coordination Namespace (node is a dedicated CNS Server), parts of its memory or none of its memory. A node may still access the Coordination Namespace 200 even if not contributing any of its memory. The parts of the memory of the system associated with the Coordination Namespace may also be referred to as the Coordination Namespace memory or distributed memory. Various NDEs, such as NDE 280 and NDE 281 may be located in the distributed memory. In order to process Coordination Namespace Requests such as creating and reading NDEs a hashing of a named data element name (key) at a requesting client yields information about the node at which the named data element is located. This provides a single hop mechanism to locate an NDE.

In an embodiment, CNS Server characteristics include the use of a Hash table to manage tuples owned or naturally homed. In embodiments, a single hash table is provided per CNS node. Additionally, as multiple coordination namespaces can run concurrently on a node, there is more than one hash table per CNS node. Each unit has independent hash tables. There is further provided a Tuple memory in storage class memory and CNS data structures in a CNS Controller DDR. A CNS server uses a virtual address space local to the unit for accessing Tuples storage.

A CNS client is provisioned with request queues for locally initiated commands with one queue per process (e.g., allowing access to any open CNS).

In embodiments, three example access methods are provided by the extended memory architecture: (1) Direct load/store access to memory located within a node. (2) An asynchronous copy method. (3) A NDE access method. The NDE access method provides a set of commands to create, read, retrieve, and destroy NDEs in the Coordination Namespace.

When accessing the Coordination Namespace, the CNS controller (e.g., Client or Server) may perform a distributed hash function on the NDE-name to locate the data and perform the data movement. A CNS Server allows access to NDEs in a distributed system in a similar way as load-store instructions in an instruction set allows access to locations in a virtual address space. Furthermore, these NDEs are located beyond an application's virtual address space. NDEs and data in the Global Virtual Address Space may persist beyond the tenure of the application.

In embodiments, each node 12 of EM 10 includes components running methods disclosed herein for implementing data map reduce operations in a coordinated namespace (CNS) extended memory system 100.

Figure 3:
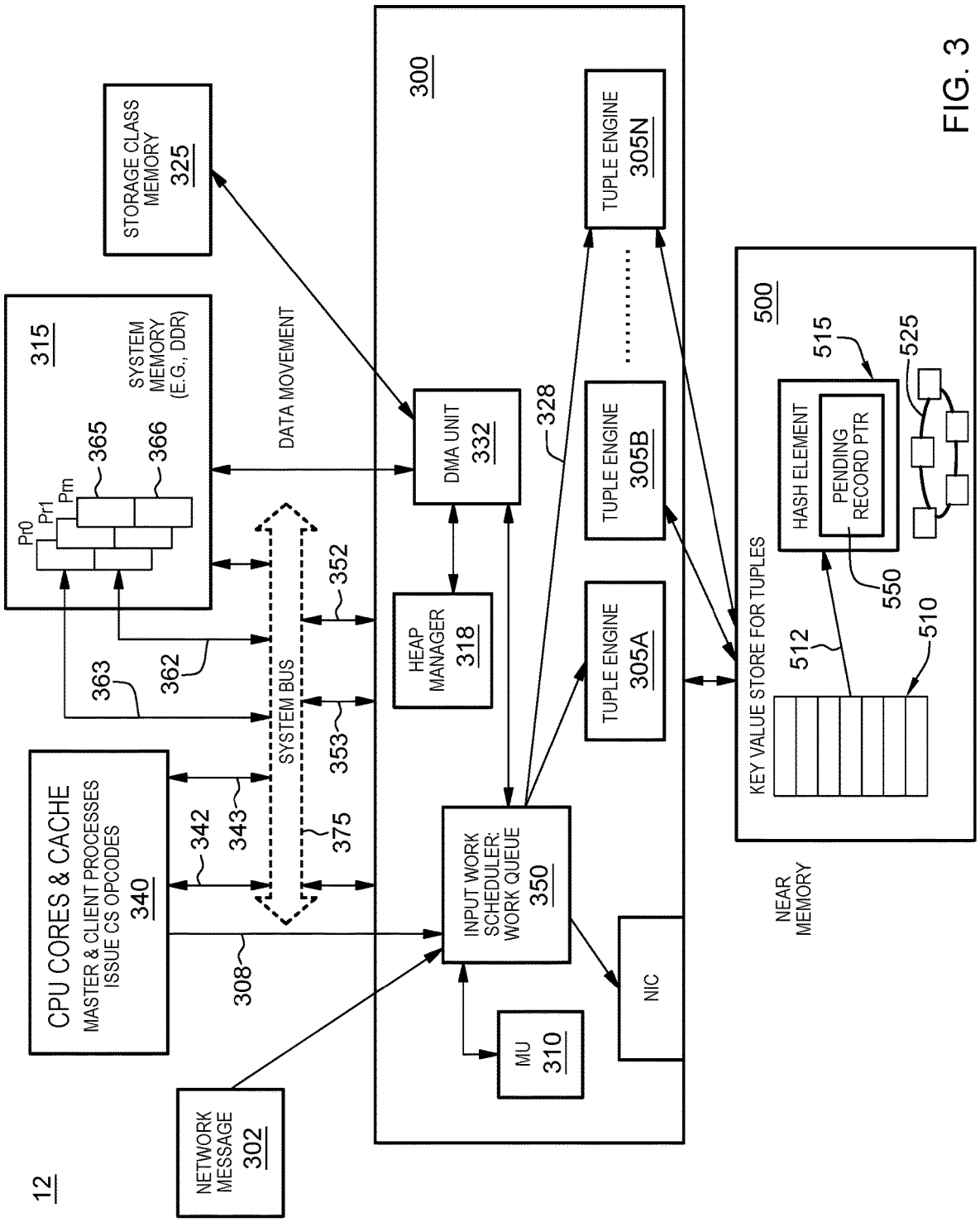
FIG. 3 schematically depicts a high-level schematic of a CNS controller for managing tuples (NDEs) in the coordinated namespace system of FIG. 2 implementing MapReduce operations.

FIG. 3 schematically depicts a high-level schematic of a CNS controller 300 at a processing node 12 for managing tuples (NDEs) in the coordinated namespace system 200 of FIG. 2 to implement tuple processing relating to data map reduce operations in the multi-node computing system. In embodiments, the controller 300 is a hardware FPGA implementation and is seen as an accelerator to process the requests offloaded by a CPU 340.

In FIG. 3, CNS controller 300 at a node 12 includes one or more tuple engines 305A, 305B, ..., 305N which are hardware units providing the processing to perform searches for tuples or create/delete tuples as needed in a near memory structure 500 (e.g., a local DDR memory). Computing using the tuple names includes hashing the name which associates for storage at nodes designated as a preferred home or a natural home. In embodiment, tuple engines respond to commands issued by work manager/scheduler 350. Tuple engines further run an aggregation/accumulation function which can be anything from a count/a total/a max. value/a min. value, etc.

Each tuple engine hardware unit 305A, 305B, ..., 305N updates local DDR data structure 510, HE, PR, LT, and RT. Further, each tuple engine: supports pending records processing as it pertains to data map reduce functionality. That is, apart from creating/searching/deleting a hash element and/or tuple record—the tuple engine further: 1) supports counting of tuples/accumulation of value provided in a received instruction; 2) interprets a CNS MapReduce shuffle (CSshuffle( ) and CNS MapReduce (CSsreduce( ) instructions; 3) stores count/accumulate value in a hash element; and 4) allows a cleaning up of all tuple records of the "key" (tuple name).

In an embodiment, near memory 500 can be a separate DRAM memory that has lower latency with respect to the tuple engines or it can be a partition within a system memory 315. The storage class memory 325 can also be another partition within system memory. A Heap manager element 318 is invoked to allocate/free memory in storage class memory.

In an embodiment, the work manager/scheduler 350 receives/processes software requests 308 (i.e., CSN opcodes) issued by CNS server and/or CNS client processes, e.g., CPU cores, and issues new work to the different Tuple processing engines 305A, 305B, ..., 305N over a ring/bus structure or multiplexor 328. The work requests may be queued in an associated WQ (not shown).

In embodiments, near memory 500 can be a RAM (e.g., DDR3) that stores a hash table 510 that, instead of hash array element values, contain pointers, such as head pointer 512 that points to a first HE 515 and a linked list structure 525 that record the location of tuples or pending requests waiting for tuples. Such a linked list structure 525 may be pointed to by a pending record pointer 550 included in hash element 515. Tuple engines 305A, 305B, 305N traverse the hash table 510 and linked list structures 525 to search, insert or delete tuple records. By calculating the hash of a tuple name, there is provided an index into the table 510 which provides the head of the linked list (i.e. the first item in each list 525 of tuple records).

A direct memory access (DMA) memory processing unit 332 is configured to move data between the system memory and storage class memory. DMA unit 332 further enables the various CNS controller hardware components to access system memory (random-access memory) 315 and/or storage class memory 325 and enable transfer of tuple data between storage, SCM and near memory 400 or vice versa independent of any central processing unit (CPU).

A messaging unit 310 is implemented for supporting the message structure for multi-node data map reduce operations.

A network interface card (NIC) 375 is provided that interfaces the CNS controller unit 300 to an external network for inter-node communications.

In embodiments, work manager element 350 receives the CNS software requests (e.g., opcode) 308 from master and client processes and keeps track of processes participating in data map reduce operations. In an embodiment, the work manager 350 can receive request messages, e.g., tuple commands 302, over the network from other nodes relating to data MapReduce operations. The work manager 350 implements process for notifying DMA unit 332 to transfer tuple data depending on the CNS opcode being processed.

Further included as part of the system memory 315 in the CNS node architecture 12 is a request queue 365 in which local processes write a request, and a completion queue 366 which are created at the start of the coordination namespace system. A single request queue and completion queue is provided for each user process, e.g., processes labeled prO, prl, ..., prn. In an embodiment, the completion queue 366 is placed consecutively after the request queue 365 array in system memory.

In an embodiment, user processes running in a CPU core 340 issues write commands to a request queue via system bus 375 providing data transfer amongst the CPU, system memory and CNS hardware controller 300. As the CNS controller hardware may not know about this new request being inserted in system memory, the process performs writing to a memory mapped IO address (MMIO address) a value —which could be the updated tail pointer of the queue that contains the request. The hardware monitors the MMIO bus and upon seeing an address belonging to it— and the corresponding value that came with the address—it compares the value with its known head pointer of the queue. If the new tail is greater than the head—then it knows that a new request has been inserted in the queue. It then proceeds to issue a load on the address corresponding to the tail pointer. If tail pointer was incremented by more than 1—then hardware loads head ptr+1, until it reaches tail of the queue. The MMIO bus carries data in packet of multiple beats. The first beat would have the address of the MMIO, and the subsequent beats have the data associated with the address.

Thus, every time a user process issues a request message 342 into the request queue 363-*a* MMIO doorbell is rung to the hardware for processing. Via messaging 353, 363 over a system bus, the CNS hardware controller 300 picks this request from the request queue 365 and processes it while the user process waits for the processing to complete. When the hardware/controller completes processing the request, it issues a completion notification message 352, 362 into this completion queue 366 for that process. The user program/processes further polls 343 via the system bus 375, this completion queue 366 for new completions. When it finds one, it clears the corresponding request from the request queue. The completion entry in the completion queue informs the user process which request got completed and some status and error messages. In an embodiment, the aggregate value from tuple reduce operations could also be included in this completion message, or it could have been in a predefined location that was indicated in the original request. The user process picks the value from this predefined location. The hardware has updated the aggregation value at this predefined location as part of its processing.

Figure 4:
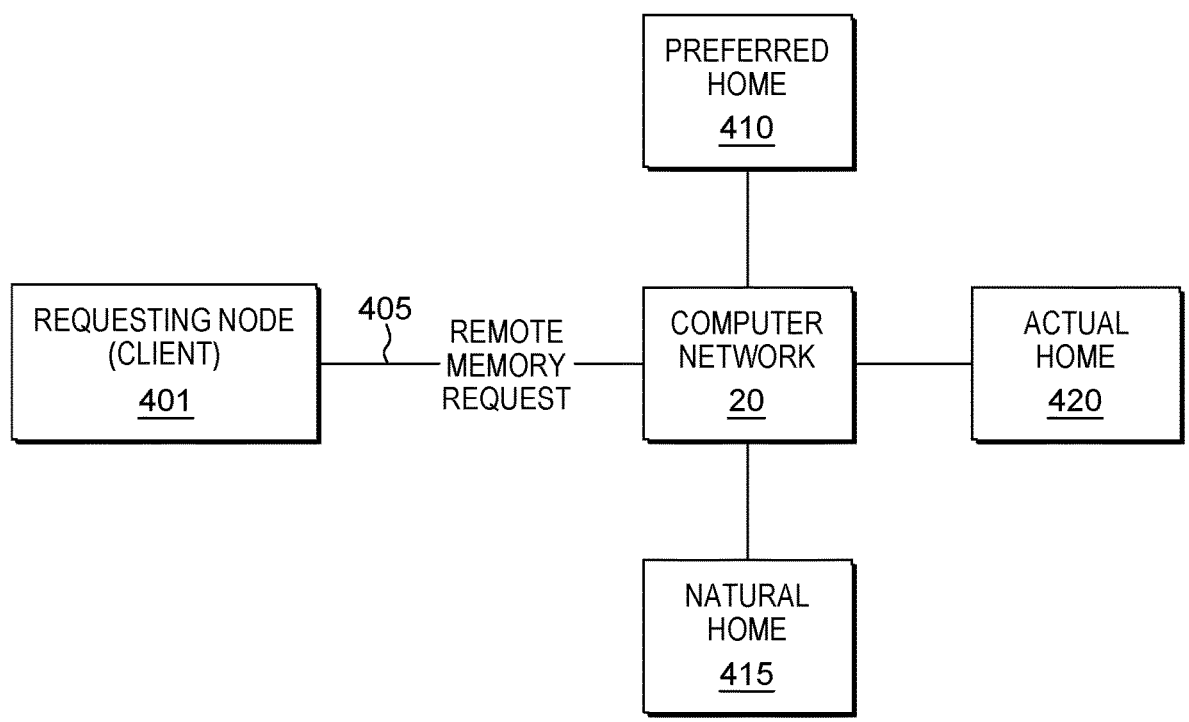
FIG. 4 shows a diagram depicting the homing of a tuple in a Coordination Namespace (CNS)

FIG. 4 shows a diagram 400 depicting the homing of a tuple in a Coordination Namespace (CNS). With respect to running a workflow or application, a requesting Node (e.g., client 401) is the location running the process making the remote memory NDE request 405, i.e., the unit 15 making the tuple command, e.g., including the tuple key or "name". At the CNS controller, the hash algorithm is applied to the tuple-name to identify the Natural Home 410. The Natural Home directly or indirectly indicates the node where the NDE is created or may be found if no other information is provided. The Preferred Home 415 may be provided by the process making the request or by prediction algorithm, e.g. running at the CNS client, for example, by an affinity parameter. The preferred home node can be a desired location, e.g., specified by a user. When supplied, the Preferred Home 415 directly or indirectly indicates the node where the NDE should be created or where to first search for the NDE. The Actual Home 420 identifies the node where the NDE resides. When creating a NDE, the Preferred Home (node) is tried first. If the tuple cannot be created there for some reason, such as out of memory an alternate home is chosen, and that node becomes the Actual Home. When a NDE is created, the Natural Home 410 always keeps a record in the local hash table indicating the Actual Home but does not store the data. In embodiments, a PH could also be the tuple's natural home (based on the hash of the name). The Natural home node will always receive the tuple based on its key hash and make and add an entry in it. When a NDE is requested, the hash table on the Preferred Home (node) 415 is searched first. If the NDE is not found, the request is sent to the Natural Home for recording the dummy pointers for the associated key. The nodes identified by the Natural, Actual, and Preferred Homes can all be different, the same, or any combination. In addition, they can also be different or the same as the requesting node. The communication between the requesting node, the Natural Home, the Preferred Home, and the Actual Home is performed via a the inter-node Network 20.

Figure 5:
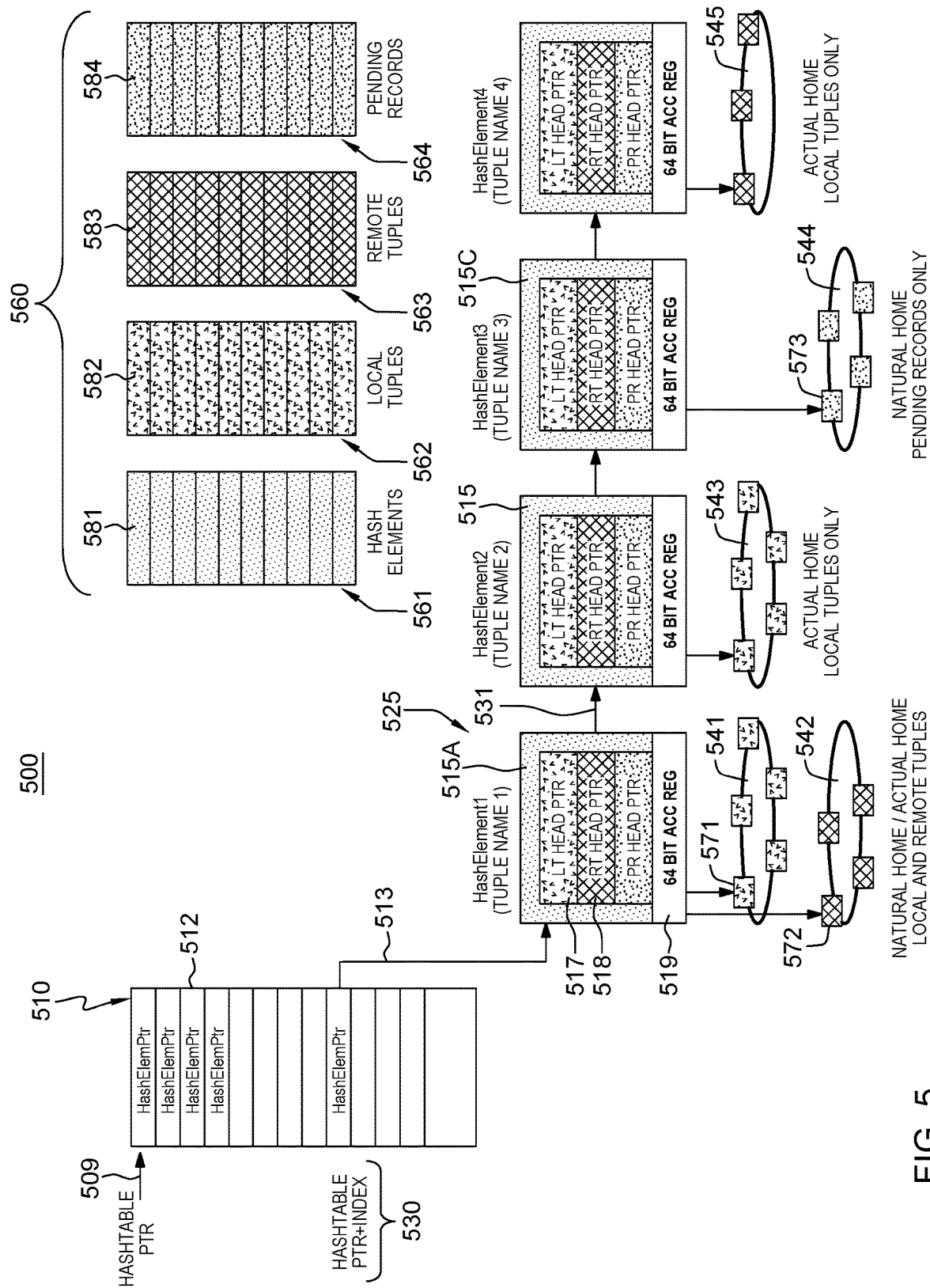
FIG. 5 depicts in greater detail the FPGA DDR hash structures in a near, or a partition in system memory implemented when performing data map reduce operations.

FIG. 5 depicts an implementation of an FPGA of a DDR hash structures in a near memory 500 (e.g. dynamic RAM (DRAM) memory or double data rate RAM (DDR)) or a partition in system memory, used for hardware support of the data MapReduce operations in the coordinated namespace architecture. In embodiments, the nodes 12 include a local or near memory of the CNS extended memory architecture.

As shown in FIG. 5 an FPGA unit 500 provides the hash table 510 in the dynamic RAM (DRAM) memory or a DDR memory, with the hash table 510 containing fixed size structures in the form of a hash table map including hash element pointer entries 512, that point to a corresponding linked list array structure 525 maintaining a linked list of pointers to various types of tuples (e.g., LT, RT and PR) stored at memory locations in the CNS extended memory. In particular, a tuple pointer (HashElemPtr) 512 points to a head pointer of the linked list 525.

In an embodiment, the hash table 510 is initially accessed by a pointer 509 based on a part of the hash value of a tuple name of a received sorting operation tuple command. The hash table map data structure 510 implements a hash function to further compute from the hash value of the tuple name a pointer index 530 for accessing a particular memory pointer element in the table 510 of memory pointers. The hash element contains the key of a tuple key-value pair. While multiple tuple keys or "names" can hash to a same index, they are linked as a linked list 525 of hash elements 515 in a linked list structure 525.

For example, as shown in FIG. 5, a HashElemPtr memory pointer 513 points to a first hash memory element, i.e., a first element 515A of a linked list of tuple storage locations in memory 500 which can be used for memory read or write operations in the CNS extended memory. That is, instead of each hash array element values, each item in the hash table map data structure 510 is simply the head pointer 513 to a first hash element item in a linked list 525. By calculating the hash of the received tuple name, there is provided an index 530 into the array table—which in provides the head 513 of the linked list (i.e. the first item in linked list 525).

In embodiments, each hash element 515 in that linked list would be for a unique tuple name, and it is possible to have multiple tuples for the same name, i.e., each hash element 515 is searched to find a tuple name (1 per hash element) and within each hash element 515 is three lists: list of local tuples (actually stored on that node), a list of remote tuples (if the node is NH for that name), a list of tuples that are known that exist somewhere else, and in an event that a request for the tuple came before the data is actually provided, e.g., by receiving an CNS "IN" opcode prior to receiving an CNS "OUT" opcode, the request is saved in a pending record. Each linked list 525 is a linked list of hash elements, with each hash element 515 including one or more of: a pointer 516 to connect to the local tuple(s) list, a pointer 517 to connect to a respective linked list structure of remote tuple(s), and/or a pointer 518 to connect to a respective linked list structure of pending record(s) all for the same tuple name, as well as a next pointer 531 to a following hash element 515 in that linked list 525.

Each of the local tuples/remote tuples/pending records connected to the given hash element 515 are connected themselves as circular doubly linked structures. Thus, as shown in FIG. 5, there are four (4) possible combination of allocation of tuple records in memory 500 as circular doubly linked structures including: 1) a circular doubly linked structure 541 of local tuples, and circular doubly linked structure 542 of remote tuples associated with a tuple name hash element if its a natural home or actual home; 2) a circular doubly linked structure 543 of only local tuples present—indicating for actual home local tuples only; 3) a circular doubly linked structure 544 of only pending records present for a given tuple—indicated for the natural home as PR cannot be present in actual homes; and 4) a circular doubly linked structure 545 of only remote tuples if only remote tuple list is present for a given tuple name—its the natural home for that tuple. In additional embodiments, a combination such as a NH=AH can exist such that both LT list and RT list would be maintained in the same node (e.g., both the natural home and actual home for the tuple).

Thus, as further shown in FIG. 5, the LT head pointer 516 of hashelement1 515A associated with a first tuple name points to a head 571 of double-linked circular list structure 541 of local tuples and the RT head pointer 517 of hashelement1 515A associated with a first tuple name can point to a head 572 of double-linked circular list structure 542 of remote tuples. Similarly, the PR head pointer 518 of hashelement1 515C associated with a third tuple name points to a head element 573 of double-linked circular list structure 544 of pending records. It is understood that a head tuple of the pointers can represent a new hash element taken from free pointer list 560 to record a first open tuple element for that name responsive to a CSOut( ) tuple command without a corresponding entry in hash table 510. When the hash table is searched, and a hash element is already found for the processed tuple name, then the linked list structure is formed by appending a new record for commands received for that same tuple name.

As further shown in FIG. 5, in support of hardware data map reduce operations, each of the hash elements 515 each have a 64 bit value memory 519 for directly storing the incremented/accumulated immediate count value, i.e., rather than storing it in SCM. Otherwise, this associated field 519 can store a pointer to an SCM location for storing the accumulated value. Thus, for every time a map reduce processing is associated with a tuple name, the counter at the tuple engine is incremented and the incremented counter value is stored back at the accumulator register 519 at the hash element for that tuple name.

In an embodiment, as shown in FIG. 5, at a node, the data value part of the tuple is stored in the local tuples 542 pointed to by the pointer as indexed in the hash element corresponding to the tuple name in the CNS structure at a node shown in FIG. 5. Using multi-bit memory storage architectures, e.g., 64 bit, there is locally stored tuple values. Performance is improved by storing this tuple value data locally within the local tuple itself in the form of immediate data.

Further, as shown in FIG. 5, there are corresponding four (4) types of free list memory buffers 560—one for each type that is needed to form these linked list structures 541, 542, 543, 544 and 545. As a tuple engine traverses the hash table and linked list structures to search, insert or delete tuple records. When a tuple engine needs to create an entry in these linked structures—it picks it up from the free lists 560 of the given type. As shown in FIG. 5, a tuple engine can pick an entry for a linked list structure from free lists associated with hash element type 561, local tuples type 562, remote tuples type 563 and pending records type 564.

In embodiments, fields for the linked list associated with hash element type 561 include a head of linked lists for local, remote and PR. For example, the fields 581 in free lists associated with hash element type 561 include: address of next HashElem, an address of a previous HashElem, an address of a HashTable parent, an address of a PendingReq (pending request), an address of a LocalTuple, and address of a RemoteTuple, etc.

Further, the fields 582 in free lists associated with Local Tuples type 562 include tuple address in SCM, size and tuple record in details in the NH including: address of the next LocalTuple, an address of a previous LocalTuple, an address of a HashElem parent, an address of actual tuple, a size of the actual tuple, and an address of the NH RemoteTuple.

Further, the fields 583 in free lists associated with Remote Tuples type 563 include details of actual home of tuple and location of tuple record in home hash table structure including: address of the next RemoteTuple, an address of a previous RemoteTuple, an address of a HashElem parent, an actual home unit of tuple, and an address of LocalTuple at home.

Further, the fields 584 in free lists associated with Pending Records type 564 include information to recreate the original request into work queue including: address of the next PendingReq, an address of previous PendingReq, an address of HashElem parent, a Requesting unit, a Requesting pid (process identifier) to facilitate memory address translations between effective address to real/physical addresses, a Requesting address, a Requesting size, aRequesting queue tag and a Request type (RD/IN).

Although not depicted, in a further embodiment, CNS controllers send commands there between in processing of tuples.

For example Coordination Namespace APIs are provided with one coordination namespace access API is csOut( ) which is a command sent from a requesting unit to a NH or PH to take the tuple from requestor and store it, i.e., create it, in the CNS. A csRD( ) is a command sent from a requesting unit to a NH or PH to retrieve a tuple from CNS, and csIn( ) is a command sent from a requesting unit to a NH or PH to retrieve the tuple from CSN and store it in the requestor node (i.e., and removing the tuple from CNS).

In embodiments, a requesting node 401 can issue a software API "csOut( )" (hardware opcode=csout) which is invoked to request creation of a new tuple in the CNS, e.g., taking the tuple from request to store in CNS system 200.

The processing of the CSOut( ) command message to create a tuple for storage at a node include steps of: receiving, at a node from a requesting node, a User Req CSOut, and in response, checking at the workload scheduler whether the node is the preferred home for the tuple, e.g., check if node=preferred home. If the node receiving the CSOut( ) command is not the preferred home, then the messaging unit sends the CSOut( ) message to the preferred home for processing that tuple. If the node receiving the CSOut( ) command is the preferred home, then the tuple engine at the node will check the hash of the tuple name and compute a hash entry address. Further the tuple engine at the receiving node issues a Read head pointer in the Hash table and searches or scans any associated hash element linked list structure for the corresponding entry in the DDR memory 500 to determine whether a tuple had been created for that tuple name.

The tuple engine will further check the response received from the DDR memory on board the FPGA unit 500, or alternatively, the system memory or any near memory which is faster/lower latency than the storage class memory, compute a next address of hash element and issue a Read hash element. Further, the tuple engine will check the DDR response, check the tuple name in hash element; and determine whether the tuple name matches the request. This process of computing next hash element address, reading the hash element and determining whether the tuple name has been created in a hash element is repeated continuously until reaching the end of the linked list structure.

That is, as long as the tuple name of hash element linked list structures does not match the request, then the tuple engine will obtain the head of local tuple list and issue a DDR read request for first local tuple. Then, the tuple engine gets the next pointer of retrieved tuple, and Issues a DDR read request for next local tuple in list. The process of reading from the DDR is repeated until the last element of the linked list is read.

If, while traversing the linked list structure, it is determined that no tuple (hash element) has been created to match the tuple name requested, a new hash element is created from the free pointer list and it is inserted into the list and a first record of the tuple name is created as a tuple hash element. That is, the CSOut( ) method will obtain a free pointer for the local tuple record and writes a new tuple record with the location of data in the SCM. The tuple engine then completes processing, notifies the work scheduler/user of the completion and notifies the Natural home of new record.

Upon scanning by the tuple engine, if a tuple hash element has already been created for the received tuple name in the linked list indicated in the CSOut( ) request, then a new record is created in the associated linked list structure for that hash element.

In embodiments, the requesting node can issue a software API "csIn( )" (hardware opcode=c sin) which is invoked to retrieve and remove a matching tuple from CNS. In CNS processing of the CSIn( ) command at a node can include steps of: receiving, at a node, a User Req CSIn, and in response, checking at the workload scheduler whether the node is the preferred home for the tuple, e.g., check if node=preferred home. If the node receiving the CSIn( ) command is not the preferred home, then the messaging unit sends the message to the preferred home for processing thereat. If the node receiving the CSIn( ) command is the preferred home, then the tuple engine at the node will check the hash of the tuple and compute a hash entry address. Further the tuple engine at the receiving node issues a Read head pointer in the Hash table and search for the corresponding entry in DDR memory. In an embodiment, if the tuple record is not found in preferred home, then this request gets sent to the natural home where information on the tuple record will be found. This might be in the form of a remote tuple that informs where the actual home is for the record. If not found, it becomes a pending request record.

The tuple engine will further check the response received from a memory controller of the DDR memory, compute a next address of hash element and issue a Read hash element. Further, the tuple engine will check the DDR response, check the tuple name in hash element; and determine whether the tuple name matches the request.

If the tuple name does not match the request, then the tuple engine will continue to check a response from the DDR memory controller.

If the tuple name does match the request, then the tuple engine will obtain the head of local tuple list and issue a DDR read request for first local tuple. Then, the tuple engine performs removing the element from linked list, updating the hash element to point to next element in list, and delete the Hash element if it was last element.

The tuple engine then informs a local memory using a direct memory access (DMA) request, to transfer data from the SCM to the local memory. Then a command is issued to update the natural home in response to the removing the tuple. Then, the tuple engine completes processing and notifies work scheduler/user of the completion.

The extended memory architecture 10 of FIG. 1 provides a hardware accelerated mechanism to support data map reduce operations for multiple parallel operating processes in a distributed multi-node computing system.

The CNS extended memory architecture provides hardware support for efficiently providing data map reduce operations in the CNS architecture. The present methods provide for a method of communication which involves participation of many nodes (all processes) in a communicator, without MPI (message passing interface standard) implementation.

Figure 6:
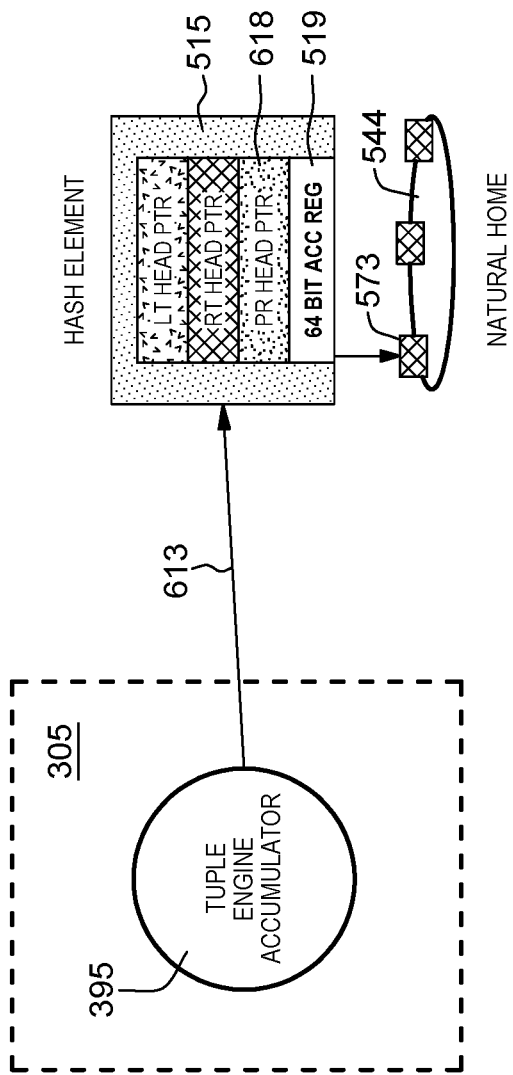
FIG. 6 depicts a tuple engine additionally provided with an accumulator register to support increment/accumulate aggregate values (e.g., an aggregation or count) according to an aggregate function used in a CNS map reduce framework.

As shown in FIG. 6, for purposes of storing a count/accumulate value in hash element in the CNS system, a tuple engine 305 is additionally provided with an accumulator register 395 to support accumulator operations, e.g., increment/decrement accumulate immediate values (e.g., an aggregate or a count) in a CNS reduce (tuple name) request. In an embodiment, the accumulation register at the tuple engine maintains a current count of a number of tuples generated and sorted and stored in the linked list structure corresponding to a specified tuple name and stored at a node. The tuple engine can increment the count for each tuple record compute a value associated with another aggregate function, e.g., maximum, minimum, average, etc for storage in register 395. Further, as shown in FIG. 6, the incremented immediate value can be additionally stored directly in a memory location 519 pointed to by the hash element. Additionally shown, pointed to by PR head pointer 618 in hash element 515 is a first pending record 573 of a circular linked list of pending records 544 for use in the tracking stored tuples. For example, in an embodiment, a CSIN/CSRD tuple command received before a CSOUT will result in creating a pending record 544 for CSIN/CSRD for association with that hash element. The pending records are released when CSOUT for the tuple name is issued. It is noted that every time a counter register in tuple engine accumulator 395 is incremented/decremented, by virtue of the tuple engine accessing that same hash element for the same tuple name, the count value is additionally stored in the memory location 519 associated with the hash element 515 created for that tuple name.

Figure 7:
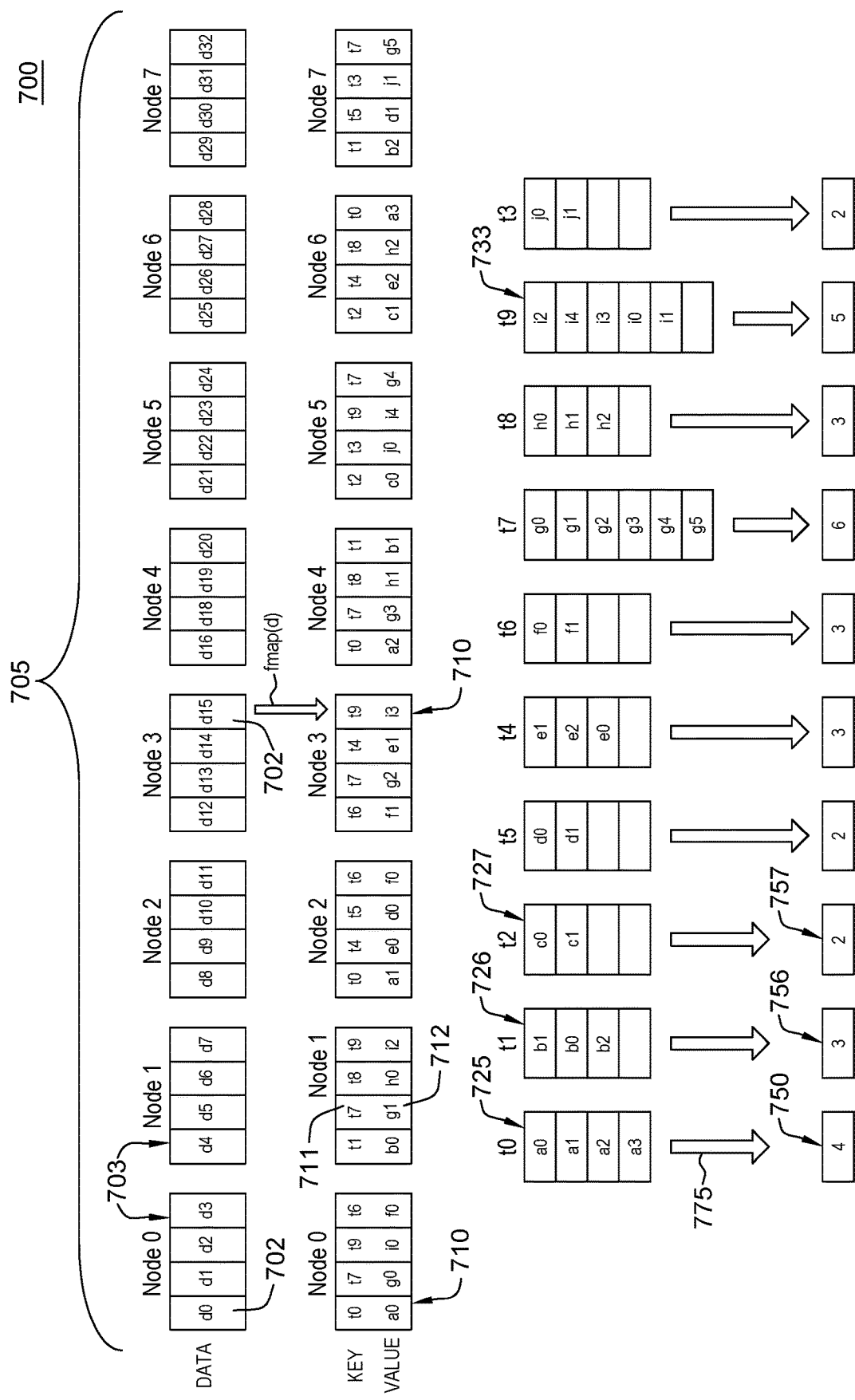
FIG. 7 generally depicts Map Reduce processing for a parallel distributed computing system in an embodiment of the invention.

FIG. 7 generally depicts Map Reduce processing 700 for a parallel distributed computing system. In the embodiment depicted, a software mapping operation takes a set of data and converts it into another set of data, where each individual data element is broken down into a respective tuple (key/value pair). Distributed nodes 705 of a multi-node computing system, e.g., nodes labeled Node 0, Node 1, . . . , Node 7 in FIG. 7, include processing elements performing processes that generate data 702, e.g., Node 0 generates data items d0-d3, Node 1 generates data d4-d7, etc. Each node 703 runs a predetermined software mapping function (fmap(d)) that generates a tuple pair 710 corresponding to each data item 702. Generally, to generate corresponding tuples, the data mapping function performs the following:

$$\mathrm{data}(dn) => <\mathrm{key}=fmap(d), \mathrm{value}=fval(d)>$$

where "n" is a number greater than or equal to 0, fmap(d) is the function applied to data "d" 702 for generating a corresponding key 711 and a function fval(d) is applied for generating the tuple value 712 based on the data value. As an example, considering data d0, d1, . . . , d32 at nodes 710, a mapping function applied to data at each node generates corresponding example key, value tuples:

$$d0 => (t0, a0),$$

$$d1 => (t7, g0),$$

$$d2 => (t9, i0),$$

. . .

$$d32 => (t2, g5)$$

As further shown in FIG. 7, nodes 703 storing tuples 710 perform a shuffle operation. That is, for each stored tuple 710 (i.e., key,/value pair) generated at the node, a sorting function applied at each of the nodes generates groupings based on the tuple name (=key). Generally, as shown in FIG.

7, a queue 725 is generated at a node (e.g., a tuple natural or preferred home) for storing all of the tuples amongst all of the nodes having the same key (tuple name). For example a separate queue 725 is generated corresponding to each respective tuple name, e.g., keys t0, t1, . . . , t9. For example, running a sorting process for the tuple key=t0, it is found that Node 0, Node 2, Node 4 and Node 6 each have generated a tuple with that key name. These nodes sort the t0 tuple and store each tuple entity having the same key name into a single queue 725. Further, for example, tuples having a key named "t1" shown stored at nodes Node 1, Node 4 and Node 7 are sorted and their corresponding tuple values b0, b1 and b2 are stored at a single queue 726, while generated tuples having a key named "t2" shown stored at nodes Node 5 and Node 6 are sorted and their corresponding tuple values c0, c1 are stored at a single queue 727, etc. The sorting function is applied at each node for populating queues 725, 726, . . . , up to queue 733 storing values associated with tuple name t9.

Then, a reduce task is performed which takes the output from the mapping as an input and combines those data tuples into a smaller set of tuples. As the sequence of the name MapReduce implies, the reduce task is always performed after the map job.

In accordance with a reducing a reduce operation, for association with a corresponding queue 725, there is generated for storage a map reduce value based on a specified aggregation function type. For example, the aggregate function type can be a maximum value, a total value, a count, a minimum value, an average value, a mean value, etc. In the embodiment shown in FIG. 7, such an aggregation function includes an aggregation or "count" of the number of data values stored in that queue. This accumulated/count value may be stored in the tuple engine accumulation register or the 64-bit register in the hash element. For example, for queue 725 associated with data from nodes having generated tuple values corresponding to tuple name t0, for example, a corresponding data structure 750 is generated that includes a value of "4" corresponding to the number of tuple values (a0-a3) stored at that queue 725. Likewise, for queue 726 associated with data from nodes having generated tuple values corresponding to tuple name t1, for example, a corresponding data structure 756 is generated that includes a value of "3" corresponding to the number of tuple values (b0-b2) stored at that queue 726, while for queue 727 associated with data from nodes having generated tuple values corresponding to tuple name t2, for example, a corresponding data structure 757 is generated that includes a value of "2" corresponding to the number of tuple values (c0-c1) stored at that queue 727, etc. The reduce function is applied at any node storing a respective queue 725, 726, . . . , 733 such that there is a one-to-one correspondence 775 between a queue and its corresponding data structure storing that queue's accumulate/aggregate reduce value.

Figure 8A:
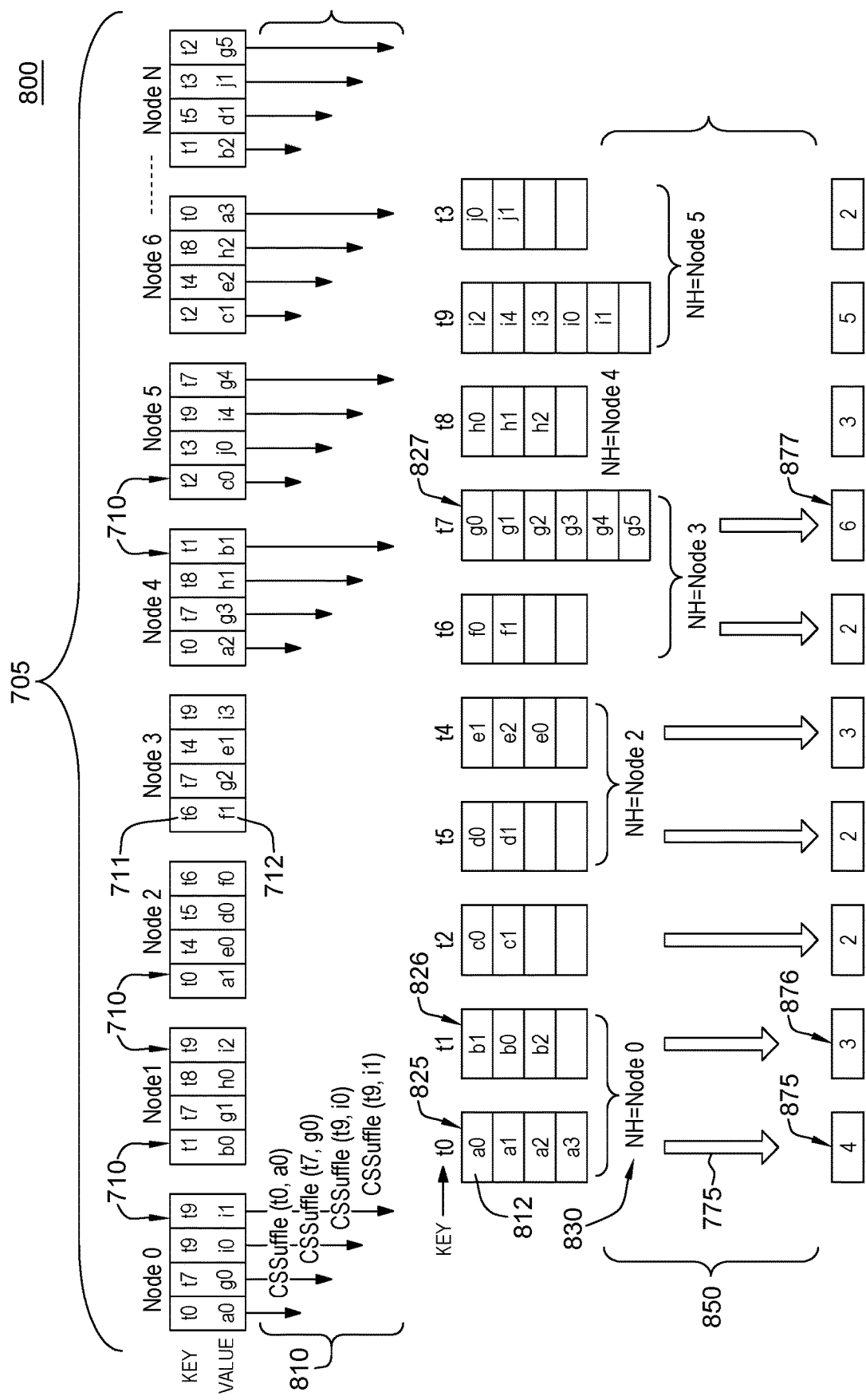
FIGS. 8A-8B depict conceptually an example multi-nodal processing system configured for data MapReduce processing in a tuple space/CNS namespace extended memory architecture with FIG. 8A generally depicting MapReduce operations in which generated tuples are stored at the natural home, and FIG. 8B generally depicting MapReduce operations in which generated tuples are stored at the preferred home.
Figure 8B:
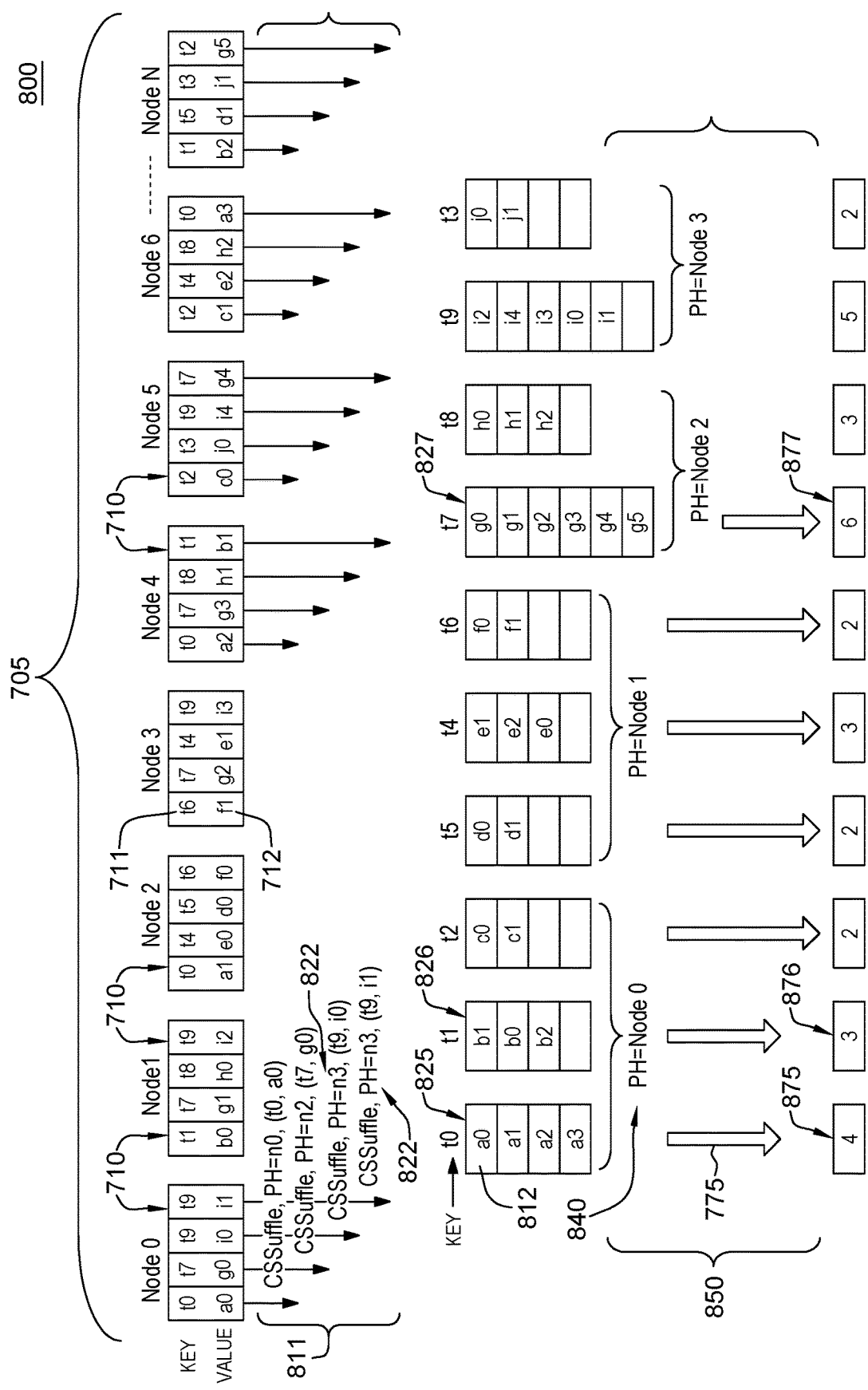

FIGS. 8A-8B depict conceptually an example multi-nodal processing system configured for data_MapReduce processing 800 in a tuple space/CNS namespace extended memory architecture.

In support of MapReduce operations in the CNS storage system, the CSShuffle (tuple name) is an opcode issued by a process thread at a node in the coordination namespace. The issued CSShuffle (tuple name, tuple value) opcode command instructs that the receiving node(s) perform a sorting function that generates groupings based on the tuple name (=key). The receiving node(s) sort the tuples and store each tuple entity having the same key name into a single queue, e.g., at the node identified by the hash value of the tuple name/key or a user selected node. In an embodiment, CSShuffle (tuple name) can include an additional parameter or flag telling the tuple engine to store the value in metadata of the tuple record pointed to by the hash element pointer. That is, each tuple data value belonging to a tuple name is stored in a linked list structure pointed to by a hash element entry corresponding to the tuple name.

In alternate embodiments, a variation of the CSShuffle opcode (e.g., CSShufflewithagreg( ) informs the tuple engine to automatically count/accumulate or aggregate the tuple data values, e.g., at the PH node, at the time of sorting tuples at that node and store this value in the memory pointed to by the hash element. Alternatively, an additional aggregate parameter or flag can be included in a CSShuffle( ) command to indicate automatic accumulation or count at the particular preferred node specified at the time of sorting tuples at that node. The aggregated tuple value is thus incremented for each tuple record stored and recorded in the hash element (e.g., register 519) and this value can be immediately returned to a requesting process responsive to a reduction operation without having to scan the hash element linked list structure. In an embodiment, any accumulator function can be done as specified by the aggregate function at the preferred home.

In an embodiment, the accumulation register at the tuple engine maintains a current count of a number of tuple records generated and stored in said linked list structure corresponding to said specified tuple name. The tuple engine increments the count for each tuple record in register 395 appended to the linked list associated with the tuple name.

Alternatively, accumulation is performed when a reduce operation specified by a CSReduce( ) opcode is issued.

The CSReduce( ) opcode is issued to obtain the reduced value for each tuple name, i.e., the user process needing this information issues an instruction that is called CSReduce (tuplename). This request gets routed to the predicted home or PH if provided, or to the natural home (NH). The tuple engine will scan through the linked list matching the key/tuple name and accumulate the value (e.g., a count or perform an aggregate function) based on the stored tuple records, and return this count value to the user (requestor node), e.g., over the network. If CSShuffle( ) already accumulated this value in the hash element, then it does not need to scan the tuple record list. CSReduce( ) also further cleans up tuple records created at predicted home/natural home.

FIG. 8A generally depicts an embodiment of performing MapReduce operations in which generated tuples are stored at the natural home. In the embodiments depicted, distributed nodes 705 shown in FIG. 8A, e.g., labeled Node 1, . . . , Node N, each runs software processes that generate a corresponding key, value pair (tuple) for each stored data element using any applied mapping function. The data tuples at any node are stored in a corresponding hash element with multiple tuples stored in a linked list data structure associated with the hash element created for that tuple name. In an embodiment, a user can specify a node or home for the tuple storage or it may be stored as a default in the tuple's Natural Home (NH).

As shown by way of example in FIG. 8A, each of labeled Nodes 0, 2, 4 and 6 include multiple tuples, with each having data mapped to a tuple name "t0" such as respective mapped data values a0, a1, a2 and a3. Similarly, Nodes 0, 1, 3, 4 and 5 each include a stored tuple having key name "t7" having respective data values g0, g1, . . . , g5.

In an embodiment, shown in FIG. 8A, each node Node 1, . . . , Node N performs a sorting operation 810 to shuffle and sort all the tuples stored in the CNS extended memory system according to the tuple names of data tuples stored at the nodes. In an embodiment, the sorting is based on hash index computed from the tuple's key name, and unless otherwise specified, all results are stored at the natural home (NH) for that tuple. That is, when a predicted or preferred home (PH) is not provided, the tuple will be stored in its natural home (NH). In an embodiment, all nodes Node N0, . . . , Node N can perform the sorting based on the tuple's key name, e.g., t0, t1, . . . , t9 and collect the data (tuple value) associated with each tuple name. In the example shown in FIG. 8A, Node 0 applies a CNS shuffle process, CSShuffle( ) for each tuple 710 stored in the memory at that node, e.g., CSShuffle (t0, a0), CSShuffle (t7, g0), CSShuffle (t9, i0) and CSShuffle (t9, i1) which outputs the corresponding data value to a particular queue associated with that tuple name. For example, associated with key name t0, the shuffle operation performed at nodes Nodes 0, 2, 4 and 6 will result in the generation of a queue 825 associated with tuple key name t0 for storing the respective tuple data values a0, a1, a2 and a3. Similarly, as a result of performing the shuffle operation CSShuffle( ) at nodes Nodes 0, 1, 3, 4 and 5, there is generated a queue 827 associated with tuple key name t7 for storing the respective tuple data values g0-g5. In embodiments, a queue, e.g., 825, 827 is a linked list structure for the given tuple name as formed by a given hash group provided by CNS functionality.

In an embodiment, shown in FIG. 8A, a tuple engine at the node (e.g., NH) performs reduce operations 850 for each queue linked list stored at a hash element to obtain an interpreted value, e.g., a count of the data values, or aggregation of the data values (tuple values) stored at that queue (e.g., a hash element). For example, as shown in FIG. 8A, for the queue 825, there is issued a CSReduce( ) command issued by user for the key named t0 to generate an interpreted value corresponding to a count 875 of the number of tuples stored there, e.g., 4, i.e., the number of data elements values a0, a1, a2 and a3. Operations 850 include issuing, by a user, a CSReduce( ) command for each key with a parameter indicating an aggregate/accumulate reduction at the tuple's natural home (NH) by tuple engines. Likewise, in the example shown in FIG. 8A, for the queue 826, there is issued a CSReduce( ) command issued by user for the key named t1 to generate an interpreted value corresponding to a count 876 of the number of tuples stored there, e.g., 3 and for the queue 827, the user-issued CSReduce( ) command for the key named t7 generates an interpreted value corresponding to a count 877 of the number of tuples stored there, e.g., 6.

In an embodiment, the reduce (interpreted) value, e.g., the immediate "count" or accumulated value of the number of values stored for that tuple name, is stored at the 64 bit value memory storage location or register 519 of the hash element shown in FIG. 6. Alternatively, the reduce (interpreted) value can be stored in the aggregator/accumulator memory register 395 of a tuple engine at the particular node having the hash element associated for storing the tuples for that node and a count incremented/decremented accordingly. This tuple count is metadata in the tuple record and is stored in the memory associated with hash element and subsequently accessed/used for applications.

In an embodiment, tuples of same key/name are collected at a same location/hashgroup, otherwise, unless otherwise specified, tuples are stored at their Natural Home.

For example, as further shown in an example embodiment of FIG. 8A, at 830, Node 0 is the natural home for tuples t0, t1. Thus, Node 0 includes a hashing function (not shown) that hashes the tuple name t0 to a corresponding hash element at the NH (=Node 0) having associated linked list structure for storing the tuple values a0, a1, a2 and a3. Similarly, Node 0 includes a hashing function that hashes the tuple name t1 to another corresponding hash element at the NH (=Node 0) having associated linked list structure for storing the tuple values b0, b1 and b2. In the example embodiment depicted in FIG. 8A, tuple t2 is stored at a hash element associated with a NH=Node 1, tuples t4, t5 are stored at respective hash element associated with a NH=Node 2, tuples t6, t7 are stored at respective hash element associated with a NH=Node 3, tuple t8 is stored at a hash element associated with a NH=Node 4, and tuples t3, t9 are stored at respective hash elements associated with a NH=Node 5.

As mentioned, when a predicted or preferred home (PH) is not provided, the generated tuple is stored in a natural home. FIG. 8B depicts MapReduce operations in a further scenario where a user or application at the node specifies a predicted (preferred) home. In the example embodiment depicted in FIG. 8B, tuples of a same key/name are collected at a same location/hashgroup, however, in the embodiment depicted, a user provides a predicted or preferred home (PH). That is, as shown in FIG. 8B, each CSShuffle( ) command specifying a sorting operation 811 to shuffle and sort all the tuples stored in the CNS extended memory system according to the tuple names of data, includes a further parameter PH 822 that assigns a preferred home PH for that tuple storage. Thus, as shown in FIG. 8B, CSShuffle( ) commands issued at processing Node 0 assigns generated tuples 710 to a resulting queue formed as a linked list structure associated with hash elements at PH locations (nodes).

Thus, as further shown in an example sorting technique 811 in the embodiment of FIG. 8B, Node 0 is assigned as the preferred home (PH) at 840, for storing tuples of keys t0, t1 and t2. Thus, Node 0 includes a hashing function (not shown) that hashes the tuple name t0 to a corresponding hash element at the PH (=Node 0) having associated linked list structure 825 for storing the tuple values a0, a1, a2 and a3. Similarly, at Node 0, the hashing function that hashes the tuple name t1 to another corresponding hash element at the PH (=Node 0) having associated linked list structure 826 for storing the tuple values b0, b1 and b2. Similarly, in the example embodiment depicted in FIG. 8B, tuples of key name t2 are stored at a hash element associated with a PH=Node 0.

Given the additional CS Shuffle( ) parameter specification 822 of preferred homes (PH) in the embodiment depicted in FIG. 8B, tuples having key names t5, t4 and t6 are sorted for storage at respective hash elements associated with a PH=Node 1, while tuples having key names t7, t8 are sorted for storage at a respective hash element associated with a node PH=Node 2. Similarly, Node 3 is assigned as the preferred home (PH) for storing tuples of keys t9 and t3. Thus, in an embodiment, a first stage sorting technique is implemented that uses a network specifying a predicted home, e.g., by issuing CS Shuffle( ) for tuple (t0, a0) and assigning a PH at node N0, while CSShuffle( ) for tuple (t7, g0) is assigned a PH at node N2 (PH=N2). The CSShuffle of tuples (t9, i0) and (t9, i1) at node zero are each assigned a PH at node N3 (PH=N3).

In an embodiment, as Local tuple records are created at predicted homes storing the tuples, then in this embodiment, reduction is performed at the PH by the tuple engines.

Figure 8C:
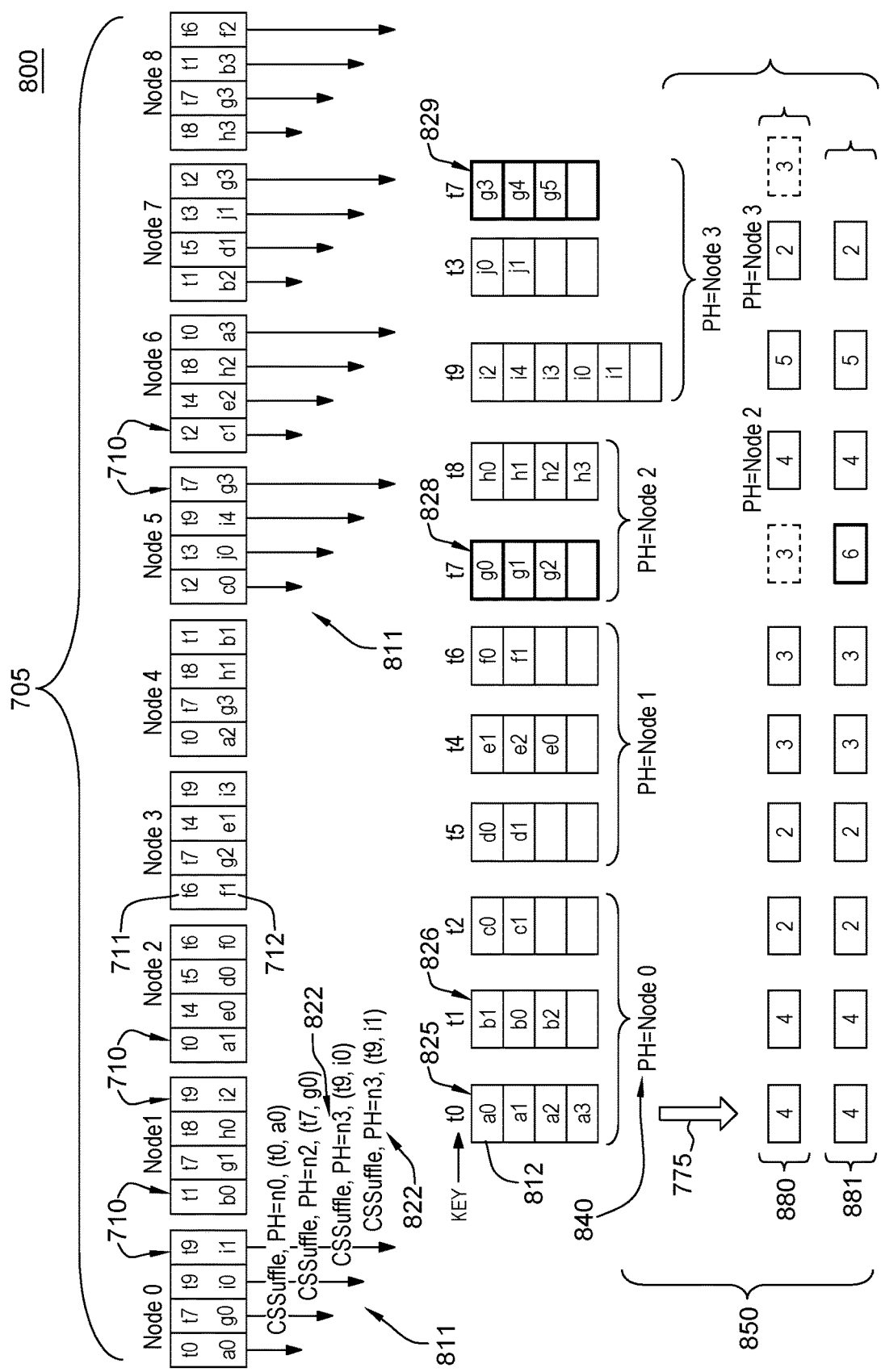
FIG. 8C depicts an embodiment of the MapReduce function which stores and collects tuples at multiple nodes in an embodiment.

FIG. 8C depicts an embodiment of the MapReduce functions which stores and collects tuples at multiple nodes. In the scenario depicted in FIG. 8B, the tuple (key name) t7 is shown stored at PH=Node 2, which can create performance issues as the multiple tuples are stored at the hash element linked list causing lengthy traversals of the tuple chain and corresponding processing bottleneck. Thus, in an example implementation depicted in FIG. 8C, for the example tuple having key name=t7, the map reduce processing enables both node 2 and node 3 to gather the t7 tuples based on predicted home (PH) provided by user. For example, a sorting function can map tuples t7 having tuple values (data) g0, g1 and g2 to a linked list structure 828 at PH=Node 2, while the sorting function further maps tuples t7 having data g3, g4 and g5 to a linked list structure 829 at PH=Node 3. Thus, in the example depicted in FIG. 8C, while the Natural home (e.g., NH=2) is still unique—computed by applying a hash function to the tuple name (e.g., t7), the CNS map reduce operations 850 performed by tuple engines in this scenario, can be performed either at a multiple predicted homes 880 at multiple PH nodes, or by tuple engines at the natural homes 881 (multiple NH nodes).

In an embodiment, the methods employ CNS processes that performs the following MapReduce operations in the coordination space architecture: 1) map reduce at a natural home including sorting and reducing operations; 2) map reduce including sorting at a preferred home and reducing at a natural home; 3) map reduce at a single preferred home; and 4) sorting at a natural home, and aggregation during shuffle and reducing at natural home.

Figure 9:
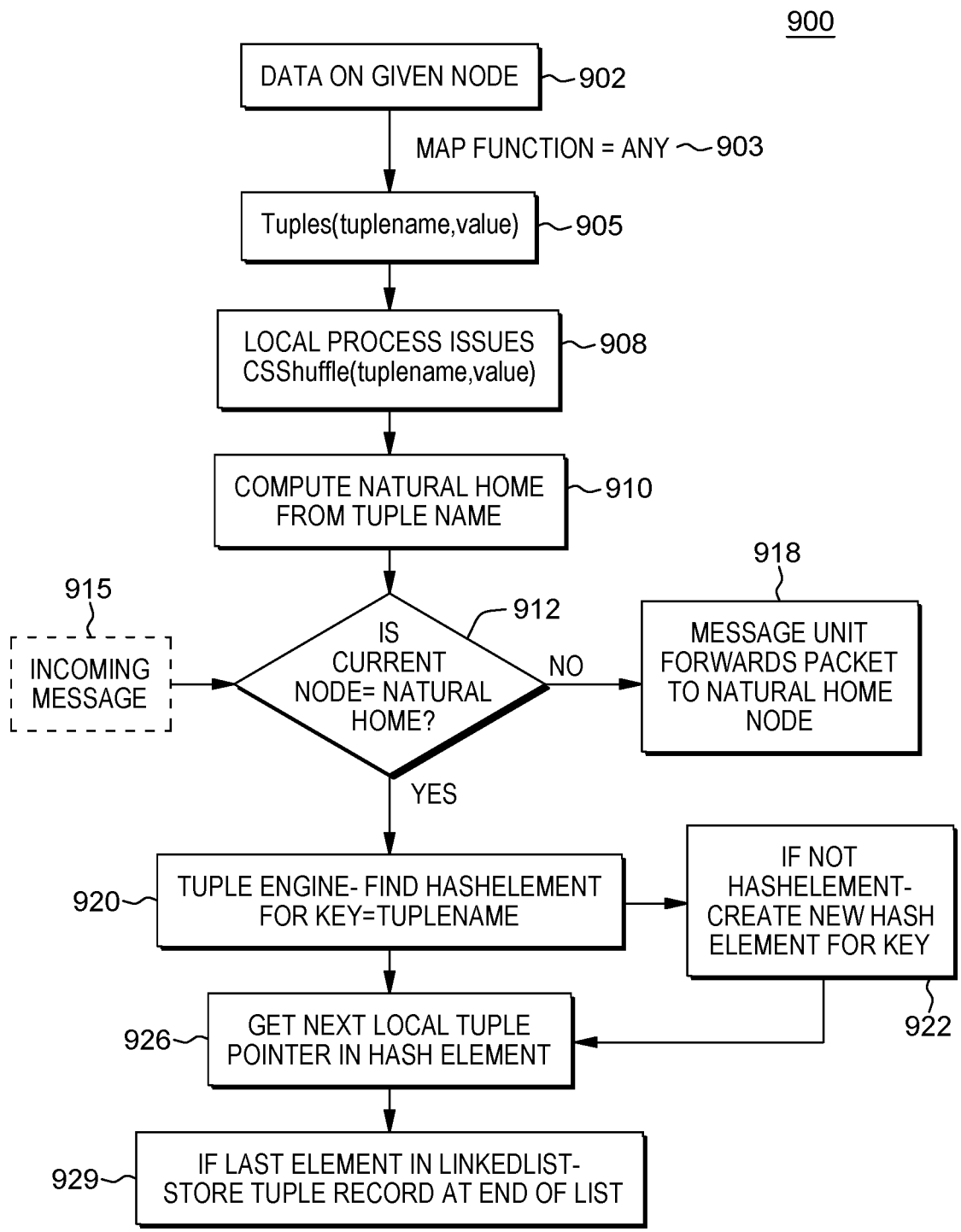
FIG. 9 depicts an embodiment of a map reduce sorting process running on the hardware controller at a natural home node of the multi-node computing environment.

FIG. 9 depicts an embodiment of a map reduce sorting process 900 running on the hardware controller at a node of the multi-node computing environment with the sorting occurring at the tuple's NH. In an example embodiment, as shown in FIG. 9, at 902, a controller process running at a given node 703 of nodes 705 generates the data 702 which is stored locally at the node. As indicated at 903, a mapping function is applied to the data 702 to generate a corresponding tuple 710. As shown at 905, the generated tuple includes a tuple name and a value associated with the stored data as shown as tuple(tuplename, value) pair. At 908, the local process at the sorting node issues a CSShuffle(tuplename, value) command. This shuffle command is a sorting function that places the tuple(tuplename, value) pair at a node associated with the tuplename. Then, at step 910, at the node 703, the work scheduler applies a hash function to the generated tuple name to compute a natural home (NH) for storing that tuple. Then, at 912, a determination is made as to whether the current node is the natural home (NH). If, at 912, it is determined that the current node is not the NH for that tuple, then the process proceeds to step 918 where the messaging unit at the controller forwards the packet to natural home node. Step 915 depicts a step of receiving a tuple message generated from another processing node. The incoming message from another node is any message from forwarded tuples, e.g., new tuple, delete tuple etc. Further internal CNS messaging, e.g. like ack, negative ack, delete tuple etc do no have tuple name—instead have the actual pointer of the local tuple being processed and have a different processing flow.

If the tuple name is provided—then if the current node is the natural home for the generated tuple at that node as determined at 912, or if the current node is a NH configured to receive the tuple message received from another processing node at 915, the process proceeds to 920 in which the tuple engine at the node seeks to find a hash element for the key=tuplename. If, at 920, a hash element has not been created for that tuple name at the NH node, then the process proceeds to 922 where the tuple engine at the node creates a new hash element for key=tuplename and the process proceeds to 926, FIG. 9. Otherwise, at 920, if it is determined that a hash element has been created for that tuple name at the NH node, then the process proceeds to 926. At 926, FIG. 9, the tuple engine obtains a next local tuple pointer in hash element, and makes a determination at 929 whether the next local tuple pointer points to a last element in a linked list-structure for storing tuple records. At 929, when a last element in the corresponding linked list at that hash element is available, then the tuple engine stores tuple record at end of the list at the NH.

Figure 10:
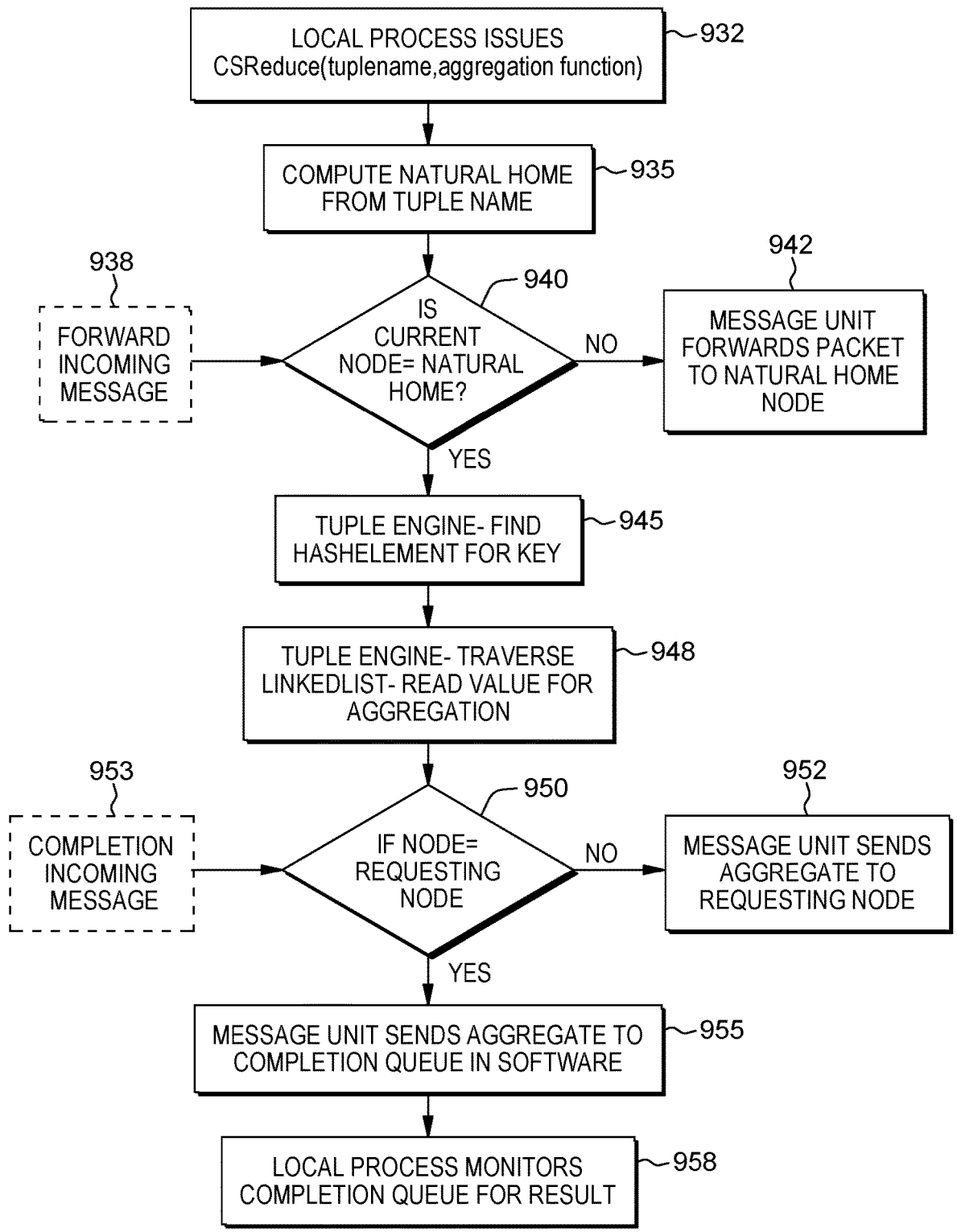
FIG. 10 depicts an embodiment of a map reduce reduction process running on the hardware controller at a NH node for that tuplename.

FIG. 10 depicts an embodiment of a map reduce reduction process 930 running at the tuple engine of the hardware controller at a NH node for that tuplename. In an example embodiment, as shown in FIG. 10, at 932, a controller process running at the NH node issues a CSReduce (tuplename, aggregation function) instruction, and in response, at 935 includes computing a NH based on the tuple name. The process proceeds to 940 where a determination is made as to whether the current node is the NH. If, at 940, it is determined that the current node is not the NH for that tuplename, then the process proceeds to step 942 where the messaging unit at the controller forwards the packet to the natural home node. Step 938 depicts a step of receiving an incoming tuple message forwarded from another processing node with the tuple message based on the tuplename. The another processing node is a requesting node that issues the CSreduce command and is any node in the system that a user decides where the aggregate value(s) is/are to be collected. Thus, if the current node is the natural home for the generated tuple at that node as determined at 940, or if the current node is a NH configured to receive the tuple message received from another processing node at 938, the process proceeds to 945 in which the tuple engine at the node seeks to find a hash element for the key=tuplename. Then, once a corresponding hash element is found, at 948, the tuple engine traverses the linked list structure and obtains or reads the aggregation value based on the aggregate function, e.g., a maximum value, a total value, a count, a minimum value, etc. For example, the aggregate value can be the amount of tuple values (corresponding to data) stored in pending records in the linked list structure at the hash element corresponding to that tuple name.

Upon obtaining the aggregation value, the process proceeds to 950, FIG. 10 where a determination is made as to whether the current node is the requesting node, i.e., the node that issues the request for reduced aggregate function value. If at 950, it is determined that the node storing the tuple records for that tuplename is not the node requesting for the aggregate function value, then the process proceeds to 952 where the messaging unit at the CNS controller at the node sends the aggregate value to the requesting node. Step 953 depicts the receiving of a completion incoming tuple message generated from another processing node with the tuple message including the aggregate function value determined for that tuplename. Thus, if the current node is the requesting node for the aggregate (map reduce) value for the tuplename as determined at 950, or if the current node receives the incoming message including the aggregate value in a tuple message received from another processing node at 953, the process proceeds to 955 in which the messaging unit at the node sends the aggregate value (based on the aggregate function) to the completion queue (associated with the running local process at the requesting node) via software. At 958, the local process at the requesting node then monitors the completion queue storing the result aggregated value (based on the aggregation function).

As the methods 900, 930 of FIGS. 9 and 10 are performed at the NH of the tuples, this can create a bottleneck situation if all records created happened to target same node. Thus, the user is provided with the flexibility to sort at user selected nodes i.e., preferred home nodes as shown in FIG. 11.

Figure 11:
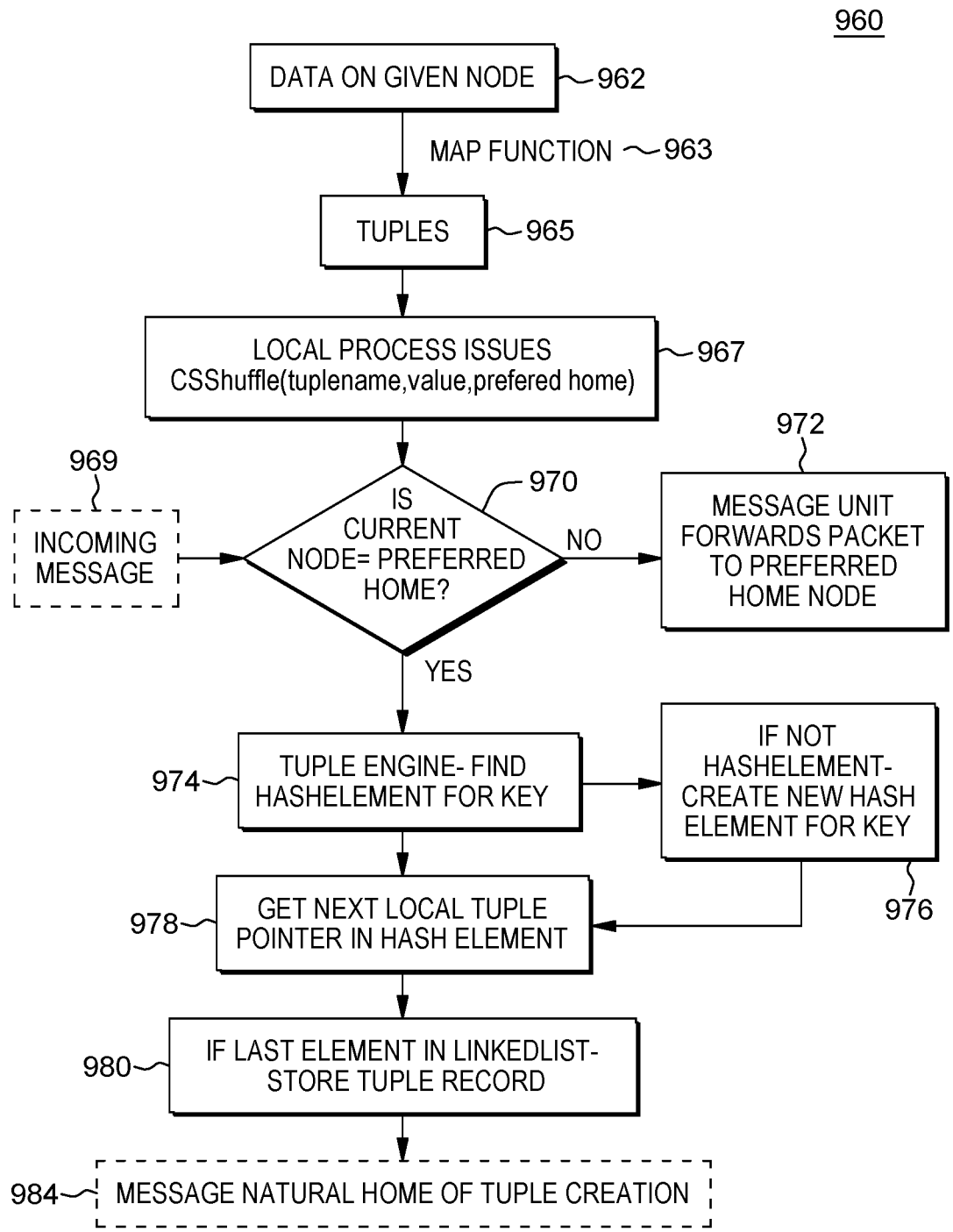
FIG. 11 depicts an embodiment of a map reduce sorting process running on the hardware controller at a node of the multi-node computing environment with the sorting occurring at a PH as desired by the user process.

FIG. 11 depicts an embodiment of a map reduce sorting process 960 running on the hardware controller at a node of the multi-node computing environment with the sorting occurring at a PH as desired by the user process. In an example embodiment, as shown in FIG. 11, at 962, a controller process running at a given node 703 generates data 702 which is stored locally at the node. As indicated at 965, a mapping function 963 is applied to the data 702 to generate a corresponding tuple 710. As shown at 967, the local process at the sorting node issues a CSShuffle(tuplename, value, preferred home) command, where the "preferred home" is the (user) desired location for storing the sorted tuples corresponding to that tuple name. The shuffle command is a sorting function that places the tuple(tuplename, value) pair at a PH node associated with the tuplename. Then, at step 970, at the node 703, the work scheduler determines whether the current node=preferred home (PH). If, at 970, it is determined that the current node is not the PH for that tuple, then the process proceeds to step 972 where the messaging unit at the controller forwards the tuple packet to preferred home node. Step 969 depicts a step of receiving a tuple message generated from an another requesting processing node (e.g., not PH) issuing the CSShuffle or CSReduce commands with tuple message based on the tuplename. Thus, if the current node is the preferred home for the generated tuple at that node as determined at 970, or if the current node is a PH configured to receive the tuple message received from another processing node at 969, the process proceeds to 974 in which the tuple engine at the PH node seeks to find a hash element for the key=tuplename. If, at 974, a hash element has not been created for that tuple name at the PH node, then the process proceeds to 976 where the tuple engine at the node creates a new hash element for key=tuplename and the process proceeds to 978, FIG. 11. Otherwise, at 974, if the tuple engine locates the hash element having been created for that tuple name at the PH node, then the process proceeds to 978. At 978, FIG. 11, the tuple engine obtains a next local tuple pointer in the hash element, and makes a determination at 980 whether the next local tuple pointer points to a last element in a linked list-structure for storing tuple records. At 980, when a last element in the corresponding linked list at that hash element is available, then the tuple engine stores tuple record at end of the list at the PH. Then, at 984, FIG. 11, the PH node storing the sorted tuples generates a message of the created or new tuple to send to the NH node corresponding to the tuplename parameter in the CS Shuffle command.

In the CNS architecture, the natural home provides a central directory of where other local tuples are stored across the system for the given tuple name. Since there can be more than one tuple with same name and created at different preferred homes, the natural home ends up being the central reference point for these tuples. So a subsequent request that doesn't know where the tuples are actually stored come to the natural home computed from the tuplename and find the actual location of the tuple (actual home).

Thus, in an embodiment, FIG. 11 depict operations for sorting the tuples first in preferred home. As these sorted tuples are eventually aggregated, the tuple's natural home is still the logical choice for the final reduction. Thus, in FIG. 12, there is performed a local reduction at the preferred home which then gets sent over to the natural home (i.e., computed from the tuple name —key). When the tuple records were created at preferred home—the CNS protocol creates a corresponding tuple record at the natural home too with a smaller set of information. Thus, the aggregation messages from the preferred home are being sent to this record present in the natural home. The tuple engine at the natural home then collects all these aggregation counters and comes up with a final tally according to the aggregation function type.

Figure 12:
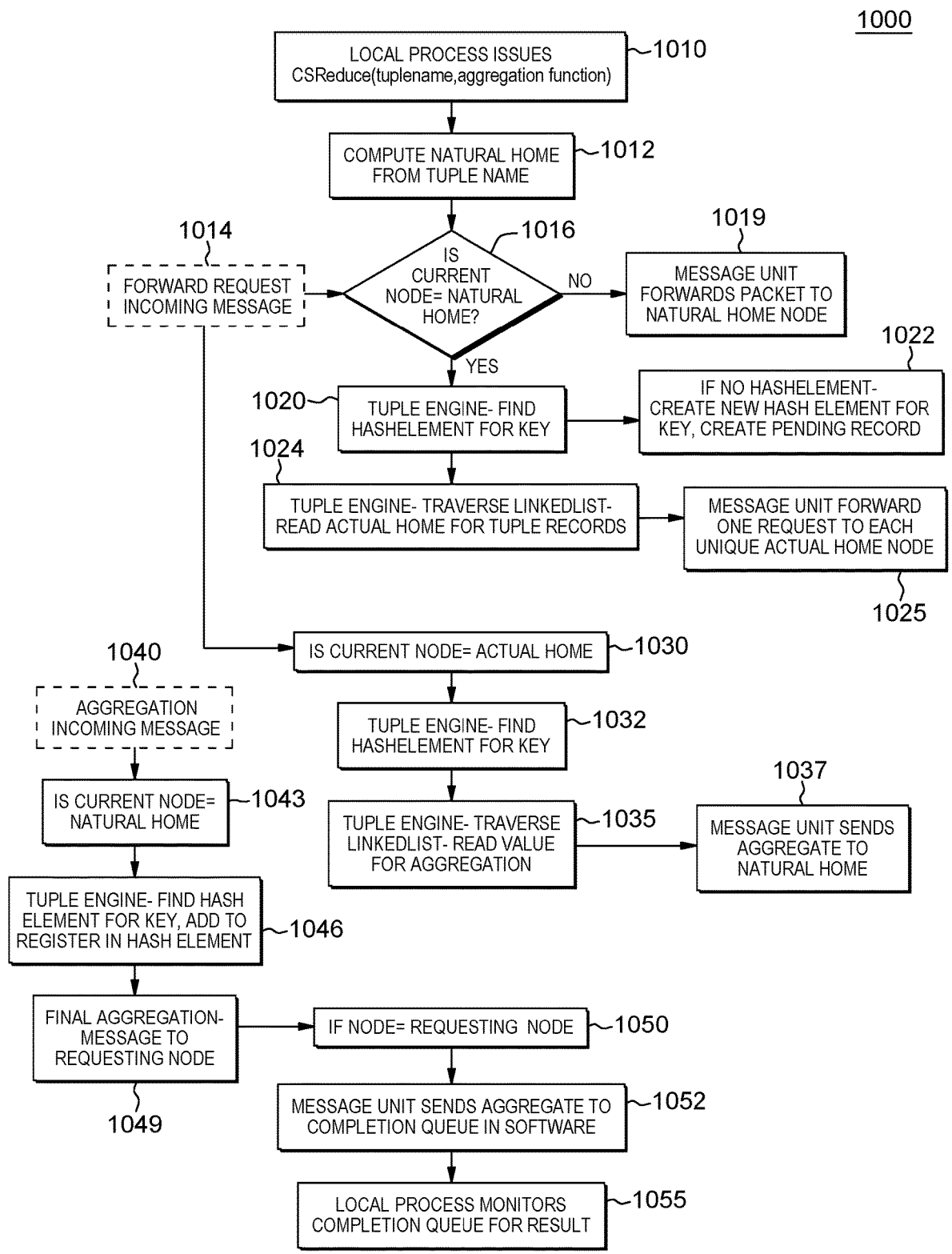
FIG. 12 depicts an embodiment of a map reduce reduction process running on the CNS hardware controller at a NH node for that tuplename when sorting occurs first at the tuples PH node.

FIG. 12 depicts an embodiment of a map reduce reduction process 1000 running on the CNS hardware controller at a NH node for that tuplename in an embodiment when sorting occurs first at the tuple's PH node(s) and a multi-stage aggregating process is then performed at the tuple's NH node. In an example embodiment, as shown in FIG. 12, at 1002, a controller process running at a node issues a CSReduce (tuplename, aggregation function) command and in response, at 1012, computes a NH based on the hash of the tuple name. The process proceeds to 1016 where a determination is made as to whether the current node=NH. If, at 1016, it is determined that the current node is not the NH for that tuplename, then the process proceeds to step 1019 where the messaging unit at the controller forwards the tuple packet to the natural home node.

Step 1014, FIG. 12 depicts a step of receiving an incoming CSReduce( ) request message for an aggregate value associated with tuple message forwarded from another actual or PH processing node with the tuple message based on the tuplename. In an embodiment, as a user does not know which preferred nodes have been selected for sorting, it now has to send the request first to the natural home.

Thus, in an embodiment, if the current node is the natural home for the generated tuple at that node as determined at 1016, or if the current node is a NH configured to receive the tuple message received from another processing node at 1014, the process proceeds to 1020 in which the tuple engine at the node seeks to find a hash element for the key=tuplename. If no hashelement exists at the NH, then at 1022, FIG. 12, the tuple engine creates a new hash element for the key (tuplename) and creates a pending record for storage at that hash element. Then, the process proceeds to 1024, where the tuple engine traverses the linked list structure and obtains or reads the actual or PH homes for tuple records. In this embodiment, step 1024 of FIG. 12 represents the tuple engine traversing or scanning the linked list structure to read the actual home node for multiple actual home tuple records in the natural home. That is, the natural home can always be queried as it stores the actual home of the tuples (not preferred homes). Thus, via processing steps 1016, 1020, 1024, the NH knows which node was the actual home (AH) or preferred home for that particular tuple name (key). In one embodiment, at 1024, FIG. 12, there can be multiple tuple records stored at the same actual home or preferred. In response, at 1025, the messaging unit at the CNS controller at the node forwards one CSReduce( ) request (e.g., for an aggregation value) to each unique actual home node storing tuple records according to the tuple name.

Returning to step 1014, FIG. 12, as a request message for an aggregate value can be forwarded to preferred home through network, it is shown arriving at the node at 1030, FIG. 12. In response to receiving the incoming message requesting an aggregate value associated with an aggregation function forwarded from the natural home, a local reduction is then performed the PH, and the requested information is sent back to the natural home. Thus, at 1030, given that the current node is the actual home, in an embodiment, at 1032, the tuple engine at the actual node seeks to find a hash element for the key=tuplename. Then, at 1035, the tuple engine traverses the linked list structure and obtains or reads the aggregation value (based on the aggregation function type). Then, at 1037, the CNS controller messaging unit sends the aggregate value to the natural home associated with the tuple name as part of the multistage aggregating process.

FIG. 12, step 1040 depicts the receiving an aggregation incoming message(s), e.g., received from an actual or preferred home, e.g., based on a message(s) sent from an actual node at 1037. That is, in the case that multiple actual home tuple records are found in the natural home at step 1024, multiple aggregation incoming messages are received at 1040 from those the actual homes. Then, at 1043, for each aggregation incoming message received at 1040, upon determining that the current node=Natural home, the process proceeds to 1046 where the tuple engine finds a hash element for the key (tuplename), adds/increments a count value to the tuple aggregation register 395 in the tuple engine, which data value gets immediately loaded to the 64 bit accumulation memory location 519 in the hash element in FIG. 6). Then, at 1049, a final aggregation message is sent to the requesting node. At 1050, FIG. 12, as the current node is also the requesting node, the process proceeds to 1052 where the messaging unit sends the aggregate value to the completion queue associated with the local running process via the software. Then, at 1055, the local process monitors the completion queue storing the result aggregated value.

In the embodiment depicted in FIG. 12, it is the case that tuples for a same key were sorted in multiple preferred homes as shown depicted in the example of FIG. 8C. Thus, as part of a "second stage" of an accumulation process multiple aggregation messages are received at 1040 from different preferred nodes, and they get collected into one final tally at the natural home of the tuple name at 1052 in FIG. 12. This information is sent back to the requesting node/user at 1052.

In an embodiment, the map reduce flows depicted in FIGS. 11 and 12 can be directed to sorting and reducing operations processing at a single preferred home (node). Thus, as step 1024 of FIG. 12 represents the tuple engine traversing the linked list structure to read the actual home for tuple records, it is the case that there is found multiple actual home records in the natural home. However, in a further embodiment, there is just one preferred home. Thus, only one (1) message will be transmitted out at step 1037. Similarly, in this embodiment where sorting and reduction occur at a single preferred home, only one (1) aggregation incoming message would be received at step 1040, FIG. 12 from the preferred home.

Figure 13:
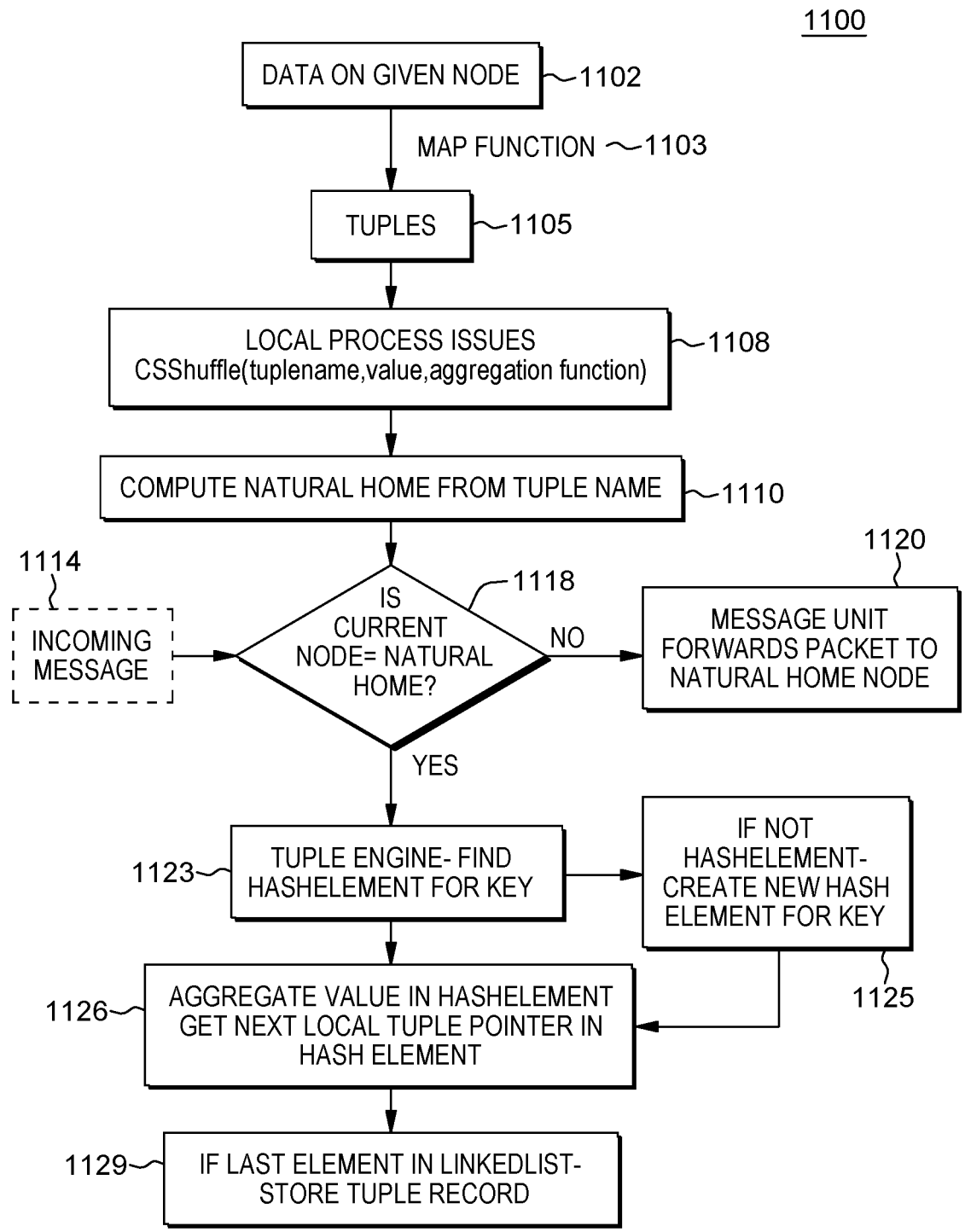
FIG. 13 depicts an embodiment of a map reduce sorting process running on the hardware controller at a NH node of the multi-node computing environment that includes aggregating during the sorting.

FIG. 13 depicts an embodiment of a map reduce sorting process 1100 running on the hardware controller at a NH node of the multi-node computing environment that includes aggregating during the sorting. In an example embodiment, as shown in FIG. 13, at 1102, a controller process running at a given node 703 generates data which is stored locally at the node. As indicated, a mapping function 1103 is applied to the data 702 to generate a corresponding tuple 710. As shown at 1108, the local process at the sorting node issues a CSShuffle(tuplename, value, aggregation function) command, where the "aggregation function" is a type corresponding to the desired aggregate value for the reducing, e.g., a maximum value, a total value, a count, a minimum value, an average value, a mean value, etc. The shuffle command is a sorting function that places the tuple(tuplename, value) pair at a node associated with the tuplename. Then, at 1110 the tuple engine computes a NH based on the tuple name parameter. The process proceeds to 1118 where a determination is made as to whether the current node=NH. If, at 1118, it is determined that the current node is not the NH for that tuplename, then the process proceeds to step 1120 where the messaging unit at the controller forwards the message packet to the natural home node.

Step 1114 depicts a step of receiving an incoming tuple message forwarded from another processing node with the tuple message based on the tuplename. Thus, if the current node is the natural home for the generated tuple at that node as determined at 1110, or if the current node is a NH configured to receive the tuple message received from another processing node at 1114, the process proceeds to 1123 in which the tuple engine at the node seeks to find a hash element for the key=tuplename.

If, at 1123, a hash element has not been created for that tuple name at the current node, then the process proceeds to 1125 where the tuple engine at the natural node creates a new hash element for key=tuplename and the process proceeds to 1126, FIG. 13. Otherwise, at 1123, if the tuple engine locates the hash element having been created for that tuple name at the NH node, then the process proceeds to 1126 where the value stored in the hashelement is aggregated. Further, at 1126, there is obtained by the tuple engine a next local tuple pointer in the hash element. When the next local tuple pointer points to the last element in the linked list, then the tuple record is stored at this pointed to hash element storage location as indicated at 1129, FIG. 13.

Figure 14:
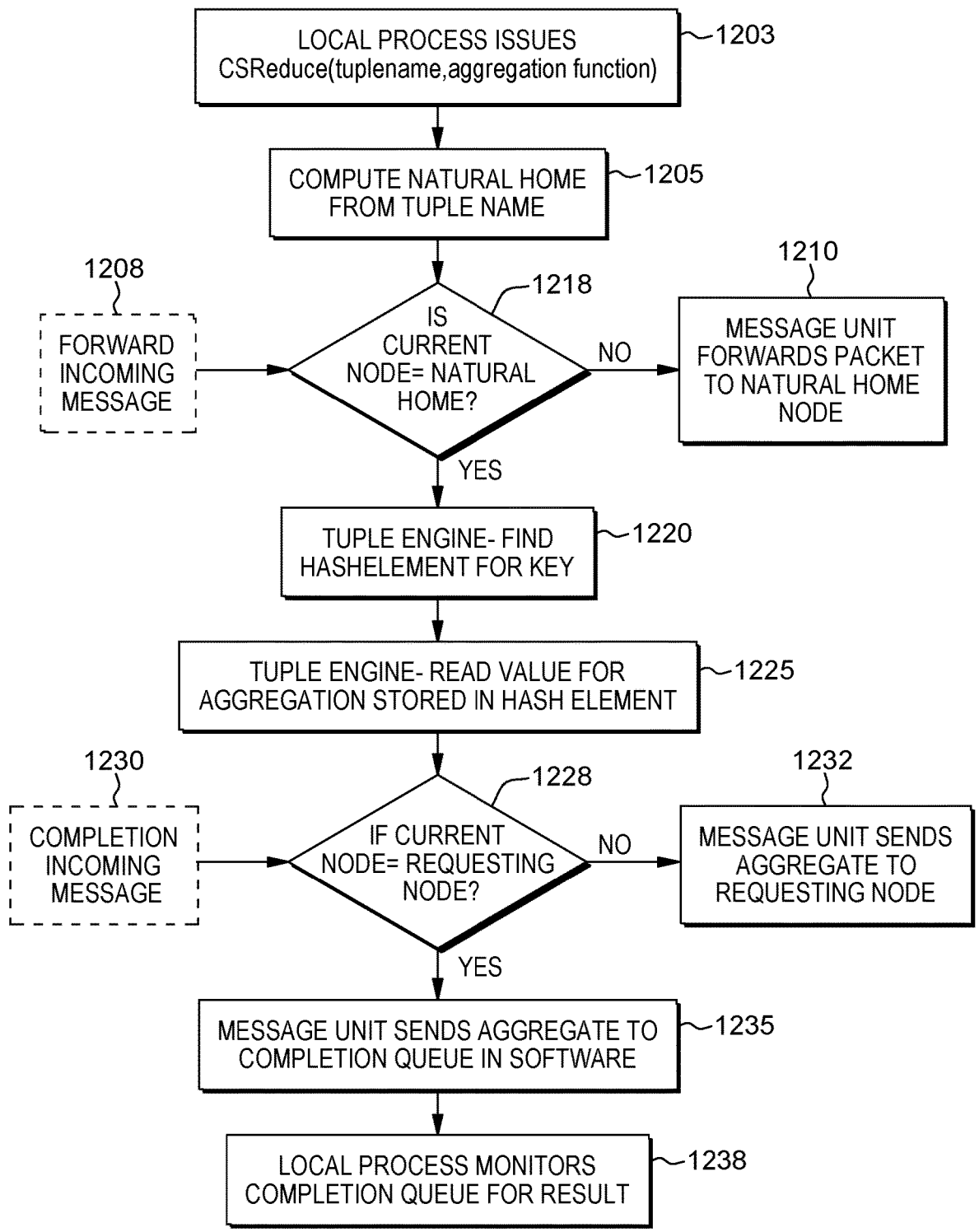
FIG. 14 depicts an embodiment of a map reduce reduction process running on the CNS hardware controller at a NH node for that tuplename.

FIG. 14 depicts an embodiment of a map reduce reduction process 1200 running on the CNS hardware controller at a NH node for that tuplename. In an example embodiment, as shown in FIG. 14, at 1203, a controller process running at the NH node issues a CSReduce (tuplename, aggregation function) command, and in response, at 1205, computing a NH based on the tuple name. The process proceeds to 1218 where a determination is made as to whether the current node=NH. If, at 1218, it is determined that the current node is not the NH for that tuplename, then the process proceeds to step 1210 where the messaging unit at the controller forwards the tuple packet to the natural home node.

Step 1208, FIG. 14 depicts a step of receiving an incoming request message for an aggregate value associated with tuple message forwarded from another processing node with the tuple message based on the tuplename. Thus, in an embodiment, if the current node is the natural home for the generated tuple at that node as determined at 1218, or if the current node is a NH configured to receive the tuple message received from another processing node at 1208, the process proceeds to 1220 in which the tuple engine at the node seeks to find a hash element for the key=tuplename. Then, at 1225, the tuple engine traverses the linked list structure and obtains or reads from the hash element, the aggregation value (based on the aggregation function type).

Upon obtaining the aggregation value, the process proceeds to 1228, FIG. 14 where a determination is made as to whether the current node is the requesting node, i.e., the node that issues the request for reduced aggregate function value. If at 1228, it is determined that the current node storing the tuple records for that tuplename is not the node requesting for the aggregate function value, then the process proceeds to 1232 where the messaging unit at the CNS controller at the node sends the aggregate value to the requesting node. Thus, as a request queue and completion queue for a particular user process would be on this requesting node, the completion messages have to be routed back to this node.

Step 1230 depicts a further step of receiving a completion incoming tuple message generated from an actual home node (e.g., another processing node) with the tuple message including the aggregate function value determined for that tuplename. Thus, if the current node is the requesting node for the aggregate (map reduce) value for the tuplename as determined at 1228, or if the current node receives the incoming message including the aggregate value in a tuple message received from another processing node at 1230, the process proceeds to 1235 in which the messaging unit at the CNS controller of the node sends the aggregate value (based on the aggregate function) to the completion queue via software. Then, at 1238, the local user process monitors the completion queue storing the result aggregated value.

In embodiments herein, if it desired to back reference to the data, a pointer to the data is stored in the local tuple record. The local tuple record has a field that points to where the data could be present.

As in the embodiments depicted in FIGS. 13 and 14 implementing aggregation during shuffle; the reduction needs to match this same aggregation function. If however reduce needs a different aggregation function—it has to traverse the whole list like in the embodiments of FIGS. 9-12.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

Having thus described our invention, what we claim as new, and desire to secure by Letters Patent is:

1. A method for mapping and reducing data generated by a plurality of processes running at one or more distributed computing nodes sharing a coordination namespace, said method comprising:

generating, by a local process running at a current node, a tuple corresponding to data generated by the local process, each said tuple having a tuple name and tuple data value corresponding to the generated data, said tuple generated by applying, by the local process, a mapping function to map the generated data to the tuple name and tuple data value;

receiving, at a controller at the current node, one or more messages requesting a shuffling operation for accumulating tuples associated with a specified tuple name;

allocating, by the controller, responsive to a received shuffle message, a named data element corresponding to the specified tuple name in said coordination namespace at the current node or another node;

storing, at one or more memory locations associated with said named data element, tuple data records including the tuple data values from each said one or more messages received at said current node or another node corresponding to data generated from said local processes specifying said tuple name, said tuple data records for said tuple name stored according to a linked list structure in said one or more memory locations of said named data element, said linked list structure storing corresponding pointers to said tuple data values;

receiving, at the controller, a reduce message from a requesting process running at the current node or another node, said reduce message specifying the tuple name and an aggregation function;

returning, using said controller, a data corresponding to said aggregation function associated with the stored tuple data values associated with said tuple name, said data comprising a current value corresponding to an aggregated value associated with the tuples generated to said tuple name and stored at said named data element, said aggregated value returned to a requesting process responsive to the received reduce message; and receiving, at the current node, a shuffling message specifying the tuple name; and responsive to receiving, at the current node, a shuffling message specifying the tuple name:

prior to said allocating a named data element, applying a hash function to said tuple name to obtain a hash value, and using said hash value to determine a natural home node location to store the tuple;

determining whether the current node is the natural home node, and if the current node is the natural home node, then allocate said named data element, otherwise:

sending the shuffling message over the network for processing at the natural home node.

2. The method of claim 1, further comprising:

storing said tuple data values in a memory associated with the current node or another node, and storing corresponding pointers to said tuple data values in said linked list structure.

3. The method of claim 1, wherein responsive to receiving a shuffling message specifying the tuple name:

first determining whether a hash table element has been created for said tuple name, and if a hast table element has been created, locating a pointer to a last element of said linked list;

generating a tuple record having a tuple data value associated with the tuple name; and appending the tuple record having associated tuple data value to an end of the linked list structure.

4. The method of claim 3, wherein to locate the pointer, said method further comprises:

apply a hash function to said tuple name to obtain a hash value, and use said hash value as an index into a hash table element, said hash table element comprising a pointer to a last element of the linked list structure in said allocated memory.

5. The method of claim 1, wherein said returning data corresponding to said aggregation function further comprises one of: a count, an average, a max, a minima, or other statistical function value, said method further comprising:
notifying, by said controller, a completion queue in a memory associated with a local process requesting said data corresponding aggregation function, said local process polling said completion queue to inform the local process that a received request is completed.

6. The method of claim 1, further comprising, responsive to receiving a reduce message from a requesting process running at the current node or another node:
scanning the linked list structure of stored tuple data records associated with the tuple name;
generating, responsive to said scanning, a data value corresponding to a type of aggregation function; and
returning said data value to said requesting process.

7. The method of claim 6, further comprising:
maintaining, at an accumulation register at the controller, a current count of a number of tuple data records stored in said linked list structure corresponding to said specified tuple name; and
incrementing said count for each said tuple data record appended to said linked list associated with said tuple name.

8. The method of claim 6, wherein the received shuffle message specifies a parameter indicating a preferred home node at the network in which tuple data records are accumulated for storage in a memory as part of a linked list structure of a named data element based on the tuple name; said method further comprising:
responsive to receiving said shuffle message:
determining, by said controller, whether the current node receiving the shuffle message is the preferred node, and if it is determined that the node is the preferred node, then
allocate said named data element for said tuple name, otherwise:
sending the message over the network for adding a tuple data record to a linked list structure created at the preferred home node associated with said tuple name; and
sending a notifying message to the natural home node to record, at the natural home node, the adding of the named data element to the preferred node.

9. The method of claim 8, wherein the tuple data records associated with the tuple name are accumulated at one or more preferred nodes, and reduction performed at said one or more preferred nodes according to a specified aggregation function, said method further comprising:
receiving, at the current node, via the network, a data value associated with a reduction operation according to a specified aggregation function associated with the tuple name performed at each respective one or more preferred nodes.

10. A system for mapping and reducing data generated by a plurality of processes running at one or more distributed computing nodes sharing a coordination namespace, said system comprising:
one or more data generated by local processes running at a current node, and
the local processes configured to apply a mapping function to generate a tuple comprising a tuple name and tuple data value corresponding to the generated data;
a controller circuit associated with a current node of said multi-node computing system, said controller circuit configured to perform a method to:
receive one or more messages requesting a shuffling operation for accumulating tuples associated with a specified tuple name;
allocate, responsive to a received shuffle message, a named data element corresponding to the specified tuple name in said coordination namespace at the current node or another node;
store, at one or more memory locations associated with said named data element, tuple data records including the tuple data values from each said one or more messages received at said current node or another node corresponding to data generated data from said local processes specifying said tuple name;
receive a reduce message from a requesting process running at the current node or another node, said reduce message specifying the tuple name and an aggregation function; and
return a data corresponding to said aggregation function associated with the stored tuple data values associated with said tuple name, said data comprising a current value corresponding to an aggregated value associated with the tuples generated to said tuple name and stored at said named data element, said aggregated value returned to a requesting process responsive to the received reduce message; and
receive, at the current node, a shuffling message specifying the tuple name; and
responsive to receiving, at the current node, a shuffling message specifying the tuple name:
prior to said allocating a named data element,
applying a hash function to said tuple name to obtain a hash value, and using said hash value to determine a natural home node location to store the tuple;
determining whether the current node is the natural home node, and
if the current node is the natural home node, then allocate said named data element, otherwise:
sending the shuffling message over the network for processing at the natural home node.

11. The system of claim 10, wherein to store, said controller circuit at the current node is further configured to:
store said tuple data values in a memory associated with the current node or another node, and store corresponding pointers to said tuple data values in said linked list structure.

12. The system of claim 10, wherein responsive to receiving a shuffling message specifying the tuple name, said controller circuit at the current node is further configured to:
first determine whether a hash table element has been created for said tuple name, and if a hast table element has been created,
locate a pointer to a last element of said linked list;
generate a tuple data record having a tuple data value associated with the tuple name; and
append the tuple data record having associated tuple data value to an end of the linked list structure.

13. The system of claim 12, wherein to locate the pointer, said controller circuit is further configured to:
apply a hash function to said tuple name to obtain a hash value, and use said hash value as an index into a hash table element, said hash table element comprising a pointer to a last element of the linked list structure in said allocated memory.

14. The system of claim 10, wherein said controller circuit at the current node is further configured to:
   notify a completion queue in a memory associated with a local process requesting said data corresponding aggregation function, said local process polling said completion queue to inform the local process that a received request is completed.

15. The system of claim 10, wherein said controller circuit is further configured to, responsive to receiving a reduce message from a requesting process running at the current node or another node:
   scan the linked list structure of stored tuple data records associated with the tuple name;
   generate, responsive to said scanning, a data value corresponding to a type of aggregation function; and
   return said data value to said requesting process.

16. The system of claim 15, wherein the controller circuit is further configured to:
   maintain, at an accumulation register, a current count of a number of tuple data records stored in said linked list structure corresponding to said specified tuple name; and
   incrementing said count for each said tuple data record appended to said linked list associated with said tuple name.

17. The system of claim 15, wherein the received shuffle message specifies a parameter indicating a preferred home node at the network in which tuple records are accumulated for storage in a memory as part of a linked list structure of a named data element based on the tuple name; said controller circuit further configured to, responsive to receiving said shuffle message:
   determine whether the current node receiving the shuffle message is the preferred node, and if it is determined that the node is the preferred node, then allocate said named data element for said tuple name, otherwise:
   send the message over the network for adding a tuple record to a linked list structure created at the preferred home node associated with said tuple name; and
   send a notifying message to the natural home node to record, at the natural home node, the adding of the named data element to the preferred node.

18. The system of claim 17, wherein the tuple records associated with the tuple name are accumulated at one or more preferred home nodes, and reduction performed at said one or more preferred nodes according to a specified aggregation function, said controller circuit further configured to:
   receive at the current node, via the network, a data value associated with a reduction operation according to a specified aggregation function associated with the tuple name performed at each respective one or more preferred nodes.

* * * * *